US012415820B2

(12) United States Patent
Luo et al.

(10) Patent No.: US 12,415,820 B2
(45) Date of Patent: Sep. 16, 2025

(54) METHOD FOR POST-SYNTHETIC MODIFICATION OF METAL-ORGANIC FRAMEWORKS FOR ENHANCING HYDROPHILICITY AND WATER STABILITY OF METAL-ORGANIC FRAMEWORKS IN WATER SORPTION

(71) Applicant: The Johns Hopkins University, Baltimore, MD (US)

(72) Inventors: Tianyi Luo, Baltimore, MD (US); Michael Tsapatsis, Baltimore, MD (US); Zhiyong Xia, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 0 days.

(21) Appl. No.: 18/054,956

(22) Filed: Nov. 14, 2022

(65) Prior Publication Data

US 2023/0151031 A1 May 18, 2023

Related U.S. Application Data

(60) Provisional application No. 63/279,400, filed on Nov. 15, 2021.

(51) Int. Cl.
*C07F 7/00* (2006.01)
*C01G 25/00* (2006.01)

(52) U.S. Cl.
CPC .................................. *C07F 7/003* (2013.01)

(58) Field of Classification Search
CPC .............................. C07F 7/003; C01G 25/00
See application file for complete search history.

(56) References Cited

U.S. PATENT DOCUMENTS

2009/0281341 A1* 11/2009 Schubert ................. C07F 7/003
556/51

FOREIGN PATENT DOCUMENTS

| CN | 105214612 A | * | 1/2016 | |
| WO | WO2015/117071 | | 8/2015 | |
| WO | WO-2019186134 A1 | * | 10/2019 | ....... B01D 67/00791 |

OTHER PUBLICATIONS

24 Chemistry—A European Journal 15309-15318 (2018) (Year: 2018).*
X-M. Li, et al. 4 ACS Applied Energy Materials (2021): (Year: 2021).*
Z. Yin et al., 378 Coordination Chemistry Reviews, 500-512 (2019) (Year: 2019).*
Z. Bao et al., 9 Energy and Environmental Science, 3612-3641 (2016) (Year: 2016).*
J. Liu et al., 46 Chem. Soc. Rev., 5730-5770 (2017) (Year: 2017).*
Q. Xia et al., 15 Nano Micro Small, 1-25 (Jan. 2019) (Year: 2019).*
M. Van Vleet, 118 Chemical Reviews, 3681-3721 (2018) (Year: 2018).*
C.G. Piscopo, et al., 208 Microporous and Mesoporous Materials, 30-35 (2015) (Year: 2015).*
J. Juan-Alcañiz, et al. 3 Catalysis Science & Technology 2311-2318 (2013) (Year: 2013).*
K. Ahmad, et al. 262 Materials science and engineering: B, 114766 (2020) (Year: 2020).*
Z. Hu, et al. 50 Chemical Society Reviews. 4629-83 (Feb. 2021) (Year: 2021).*
A. Metrane et al., 67 Journal of Chemical & Engineering Data, 1617-1653 (2022) (Year: 2022).*
D. Frohlich et al., 4 Journal of Materials Chemistry A, 11859-11869 (2016) (Year: 2016).*
H. Cavka et al., 130 Journal of the American Chemical Society, 13850-13851 (2008) (Year: 2008).*
C. Trickett et al., 54 Angew. Chem. Int. Ed., 11162-11167 (2015) (Year: 2015).*
TCI America, Safety Data Sheet, 1,5-Naphthalenedisulfonic Acid Tetrahydrate (2018) (Year: 2018).*
M. Hossain et al., 58 Ind. Eng. Chem. Res., 10550-10558 (2019) (Year: 2019).*
S. Ashraf, et al. 124 International Communications in Heat and Mass Transfer 105242 (2021) (Year: 2021).*
Burtch et al., Water stability and adsorption in metal-organic frameworks. Chem Rev. Oct. 22, 2014;114(20):10575-612.
Cadiau et al., Design of hydrophilic metal organic framework water adsorbents for heat reallocation. Adv Mater. Aug. 26, 2015;27(32):4775-80.
De Lange et al., Adsorption-Driven Heat Pumps: The Potential of Metal-Organic Frameworks. Chem Rev. Nov. 25, 2015;115(22):12205-50.
Deria et al., Water stabilization of Zr6-based metal-organic frameworks via solvent-assisted ligand incorporation. Chem Sci. Sep. 1, 2015;6(9):5172-5176.
Fathieh et al., Practical water production from desert air. Sci Adv. Jun. 8, 2018;4(6):eaat3198. 9 pages.
Furukawa et al., Water adsorption in porous metal-organic frameworks and related materials. J Am Chem Soc. Mar. 19, 2014;136(11):4369-81.
Hanikel et al., MOF water harvesters. Nat Nanotechnol. May 2020;15(5):348-355.
Hanikel et al., Evolution of water structures in metal-organic frameworks for improved atmospheric water harvesting. Science. Oct. 22, 2021;374(6566):454-459.
Ji et al., Strongly Lewis Acidic Metal-Organic Frameworks for Continuous Flow Catalysis. J Am Chem Soc. Sep. 18, 2019;141(37):14878-14888.
Jiang et al., Superacidity in sulfated metal-organic framework-808. J Am Chem Soc. Sep. 17, 2014;136(37):12844-7.
Ko et al., Tailoring the Water Adsorption Properties of MIL-101 metal-Organic Frameworks by partial Functionalization. Journal of Materials Chemistry A, 3 (2015) 2057-2064.
Liu et al., Small Molecules, Big Effects: Tuning Adsorption and Catalytic Properties of Metal-Organic Frameworks. Chem. Mater. 2021, 33, 1444-1454.

(Continued)

*Primary Examiner* — Alexander R Pagano
*Assistant Examiner* — Frank S. Hou
(74) *Attorney, Agent, or Firm* — Casimir Jones, S.C.; Tristan A. Fuierer; Jeffrey W. Childers

(57) ABSTRACT

The present disclosure relates to modified metal-organic frameworks (MOFs) and a post-synthetic modification method that simultaneously enhances hydrophilicity and water stability to achieve high-performance water sorption materials.

16 Claims, 10 Drawing Sheets

(56) References Cited

OTHER PUBLICATIONS

Lu et al., Incorporation of free halide ions stabilizes metal-organic frameworks (MOFs) against pore collapse and renders large-pore Zr-MOFs functional for water harvesting. J. Mat. Chem. A, 2022, 10, 6442-6447.

Luo et al., Simultaneously Enhanced Hydrophilicity and Stability of a Metal-Organic Framework via Post-Synthetic Modification for Water Vapor Sorption/Desorption. Angew Chem Int Ed Engl. Nov. 2, 2022;61(44):e202209034. 10 pages.

Mondloch et al., Are $Zr_6$-based MOFs water stable? Linker hydrolysis vs. capillary-force-driven channel collapse. Chem Commun (Camb). Aug. 18, 2014;50(64):8944-6.

* cited by examiner

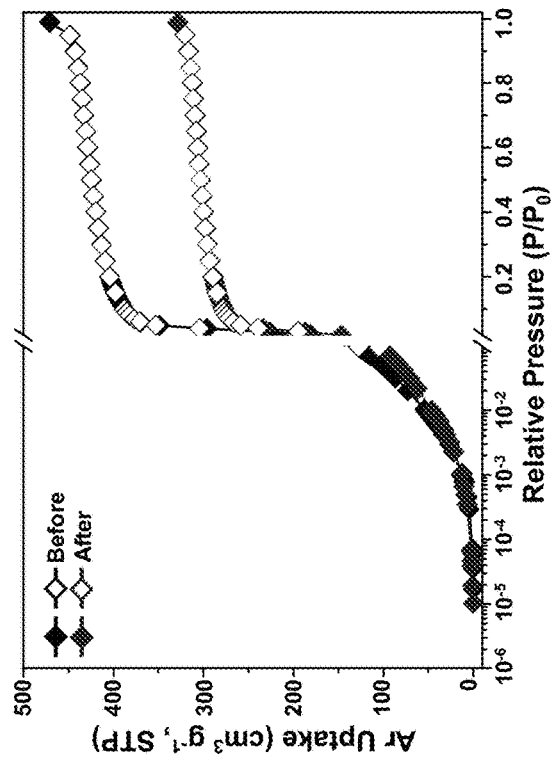
FIGURE 6A
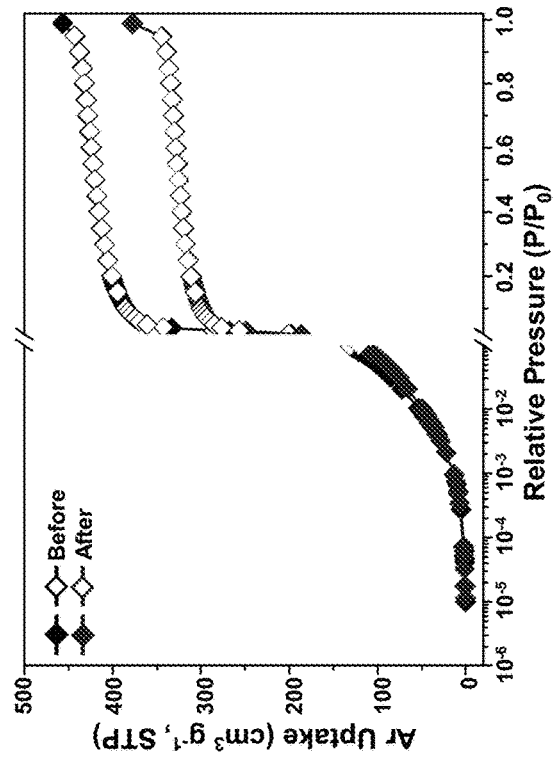
FIGURE 6B
FIGURE 6C
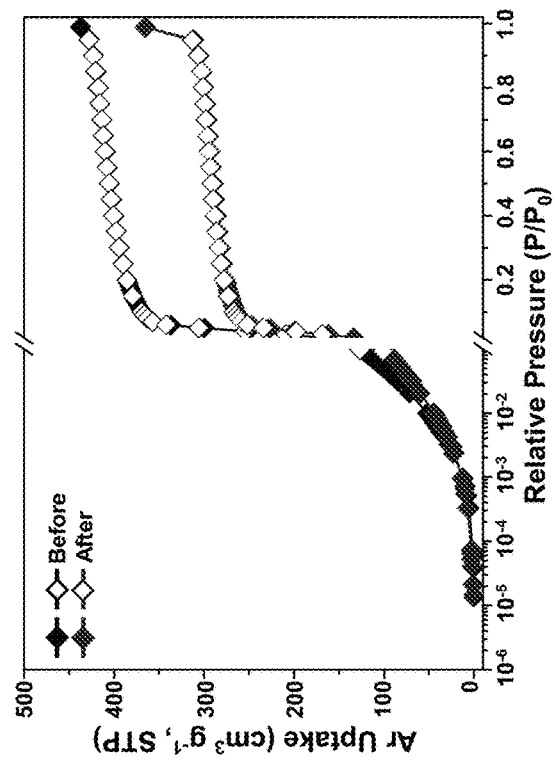
FIGURE 6D

METHOD FOR POST-SYNTHETIC MODIFICATION OF METAL-ORGANIC FRAMEWORKS FOR ENHANCING HYDROPHILICITY AND WATER STABILITY OF METAL-ORGANIC FRAMEWORKS IN WATER SORPTION

CROSS REFERENCE TO RELATED APPLICATIONS

This application is filed under the provisions of 35 U.S.C. § 111(a) and claims priority to U.S. Provisional Patent Application No. 63/279,400 filed on Nov. 15, 2021 in the name of Tianyi LUO et al. and entitled "Method for Post-Synthetic Modification of Metal-Organic Frameworks for Enhancing Hydrophilicity and Water Stability of Metal-Organic Frameworks in Water Sorption," which is hereby incorporated by reference herein in its entirety.

FEDERALLY SPONSORED RESEARCH OR DEVELOPMENT

This invention was made with government support under grant DE-SCO001004 awarded by the Department of Energy. The government has certain rights in the invention.

FIELD

The present disclosure relates to modified metal-organic frameworks (MOF) having enhanced hydrophilicity and water stability relative to unmodified, or parent, MOFs, and methods of synthesizing same. The modified MOFs are practical for potential applications such as water harvesting and adsorptive heat transformations.

BACKGROUND

Atmospheric water harvesting (AWH) (N. Hanikel, et al., 2020) and adsorptive heat transformations (AHT) (M. F. de Lange, et al., 2015) are emerging technologies poised to address energy and environmental challenges. The success of these technologies hinges upon the identification of high-performance water vapor sorption materials at specific relative humidity (RH) and temperature conditions. The ideal sorbent materials for AWH and AHT should have a high working capacity (i.e., high water vapor uptake) and sufficient water stability. To reach desirable working capacity, and enable cost-effective regeneration, the materials should be sufficiently hydrophilic, highly porous and exhibit a high water vapor uptake capacity of at least 0.2 g g$^{-1}$ (11 mmol g$^{-1}$) (D. Frohlich, et al., 2016) within the RH range of 5-30%, and preferably without sorption-desorption hysteresis (M. F. de Lange, et al., 2015). Current commercial materials, such as zeolites, silica, and active carbons, do not fulfill the requirements of these applications. Therefore, there is a pressing need for alternative materials with improved water sorption performance.

Metal-organic frameworks (MOFs), a class of crystalline porous materials comprising inorganic clusters and organic linkers have recently gained increasing attention as water vapor sorbent materials owing to their superior water uptake capacities to current commercial sorbent materials. MOFs are highly tunable and diverse in their molecular structures and chemical compositions with well-defined pore sizes ranging from a few angstroms to several nanometers in diameter. In practice, the humidity from air is captured in the pores of the MOFs and condense as liquid water therein. A change in temperature (which changes the relative humidity) releases the captured water and the MOFs are available for additional vapor capture/water release. Several stable microporous MOFs with pore diameters of a few angstroms have been developed to outcompete zeolite, silica and carbon materials in water uptake capacity below 30% RH (A. Cadiau, et al. 2015; F. Fathieh, et al., 2018. However, further enhancement in capacity of such microporous materials is limited by their small pore volumes. MOFs with bigger pores (pore diameter>1.5 nm) potentially offer larger water capacities owing to their greater pore volumes. However, MOFs of such kind are often hydrophobic. As a result, their major water uptake capacity often occurs at a RH level higher than 30%. In addition, MOFs with larger pores tend to be less stable, and often undergo irreversible structure collapsing during the water sorption-regeneration cycles. Therefore, methods are needed to simultaneously increase their water uptake capacity at lower RH and water stability.

Current arts have only demonstrated the ability to separately improve either hydrophilicity or water stability of such MOFs (N. Ko, et al., 2015; P. Deria, et al., 2015). Sometimes, the improvement in water stability is made at the expense of hydrophilicity. For example, functionalization of MOF inorganic clusters using perfluorinated carboxylic acids has been shown to improve water stability of MOFs. However, these perfluorinated aliphatic groups are hydrophobic in nature. As a result, their presence leads to more hydrophobic pores and causes the major water uptake to occur at a higher RH level in modified MOFs compared to unmodified MOFs (P. Deria, et al., 2015; X. Liu, et al., 2021). No art is known that increases both hydrophilicity and water stability of MOFs simultaneously.

The present invention relates to a post-synthetic modification method that simultaneously enhances hydrophilicity and water stability of MOFs to achieve high-performance water sorption materials, and the modified MOFs producing using said method.

SUMMARY

In one aspect, a modified metal-organic framework (MOF) material is described, comprising a zirconium-based MOF, a hafnium-based MOF, or a combination thereof, modified with at least one of a sulfonic acid group, a sulfonate group, or combinations thereof.

In another aspect, a method for post-synthetic modification of metal-organic frameworks (MOFs) is described, said method comprising contacting a parent MOF with a solution comprising an organic molecule comprising at least one of a sulfonic acid group, a sulfonate group, or combinations thereof, to form a modified MOF, wherein the parent MOF comprises a zirconium-based MOF, a hafnium-based MOF, or a combination thereof.

In still another aspect, a method for simultaneously enhancing water stability and hydrophilicity of MOFs for water sorption-based applications is described, said method comprising contacting a parent MOF with a solution comprising an organic molecule comprising at least one of a sulfonic acid group, a sulfonate group, or combinations thereof, to form a modified MOF, wherein the parent MOF comprises a zirconium-based MOF, a hafnium-based MOF, or a combination thereof and wherein the modified MOF has enhanced water stability and hydrophilicity relative to the parent MOF.

Other aspects, features and embodiments of the invention will be more fully apparent from the ensuing disclosure and appended claims.

BRIEF DESCRIPTION OF THE DRAWINGS

Figure 1A:
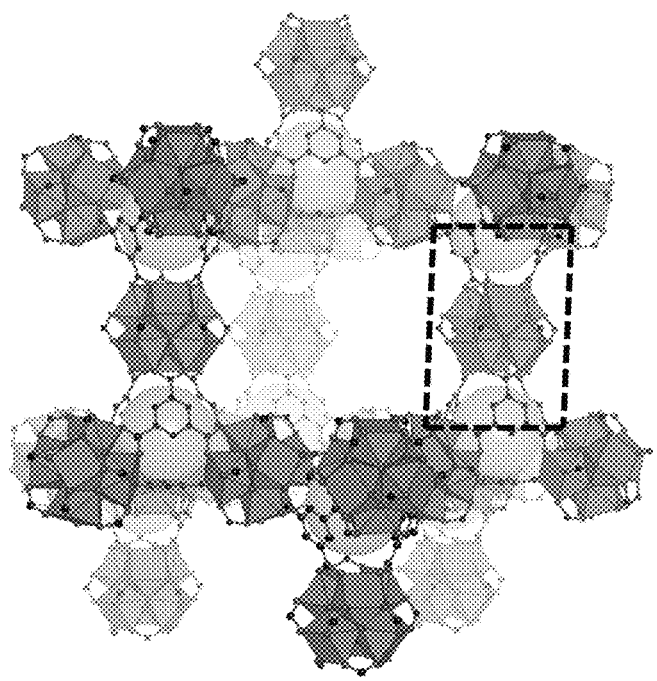

Having thus described the presently disclosed subject matter in general terms, reference will now be made to the accompanying Figures, which are not necessarily drawn to scale, and wherein:

FIG. 1A illustrates a crystal structure of MOF-808, wherein yellow spheres represent tetrahedral cavities.

Figure 1B:
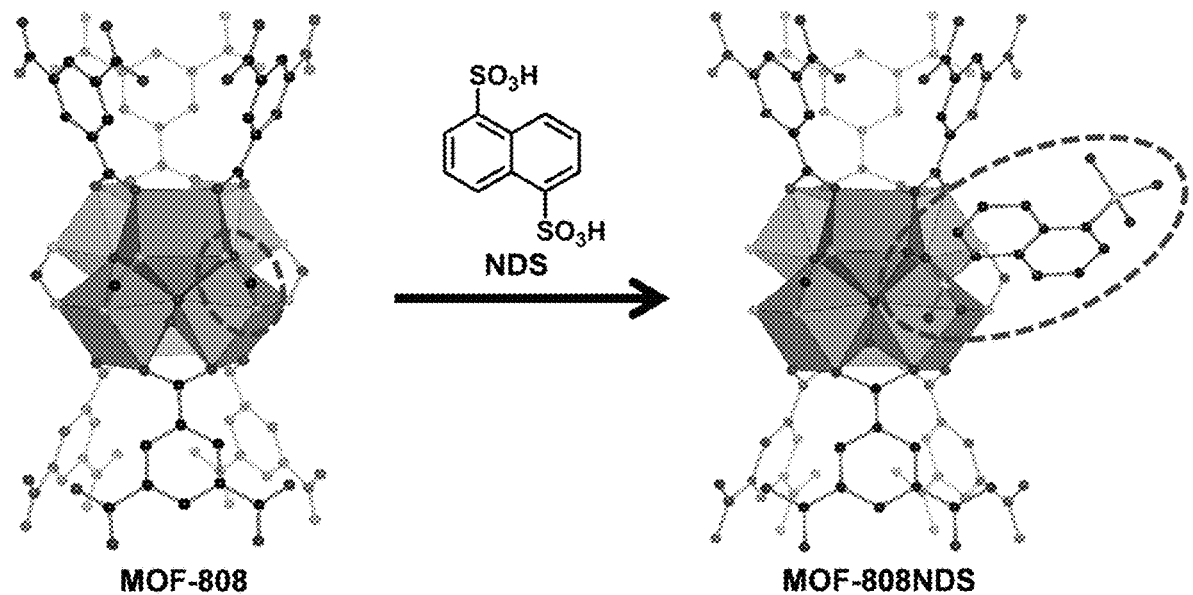

FIG. 1B illustrates a post-synthetic modification of secondary building units of MOF-808 (represented by the dashed box in FIG. 1A), wherein green polygons, black spheres, red spheres, and yellow spheres represent zirconium, carbon, oxygen, and sulfur atoms, respectively. Oxygen atoms from formate ligands are marked as pink spheres.

Figure 1C:
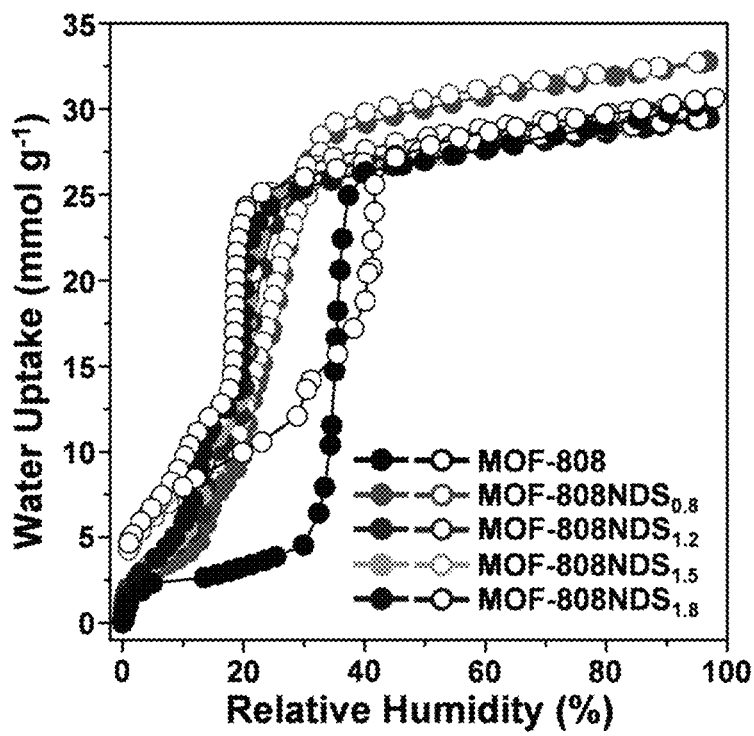

FIG. 1C shows the sorption/desorption isotherms of water vapor at 25° C. for MOF-808, MOF-808NDS$_{0.8}$, MOF-808NDS$_{1.2}$, MOF-808NDS$_{1.5}$, and MOF-808NDS$_{1.8}$. The closed and open symbols represent sorption and desorption, respectively.

Figure 1D:
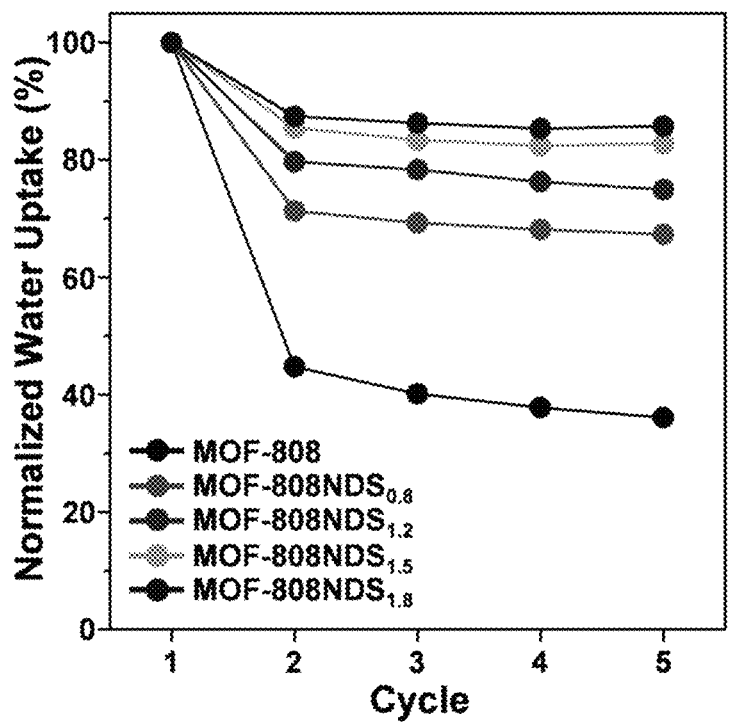

FIG. 1D shows the retained water uptake capacity of MOF-808, MOF-808NDS$_{0.8}$, MOF-808NDS$_{1.2}$, MOF-808NDS$_{1.5}$, and MOF-808NDS$_{1.8}$ materials as a function of sorption/desorption cycles.

Figure 1E:
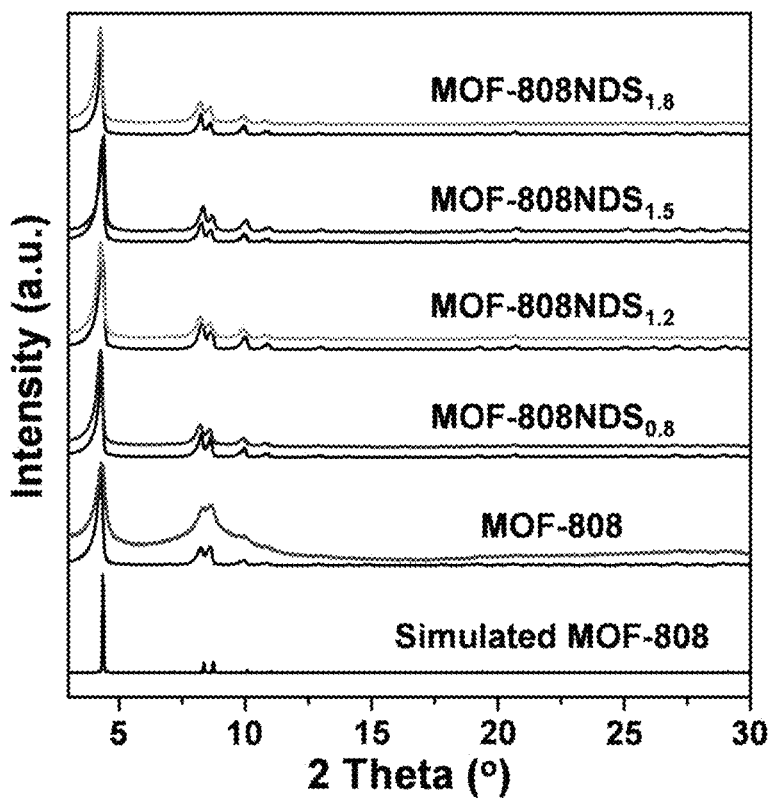

FIG. 1E illustrates normalized PXRD patterns before (black lines) and after (color lines) five cycles of water vapor sorption tests. The PXRD patterns before and after water sorption are slightly offset for visibility.

Figure 2:
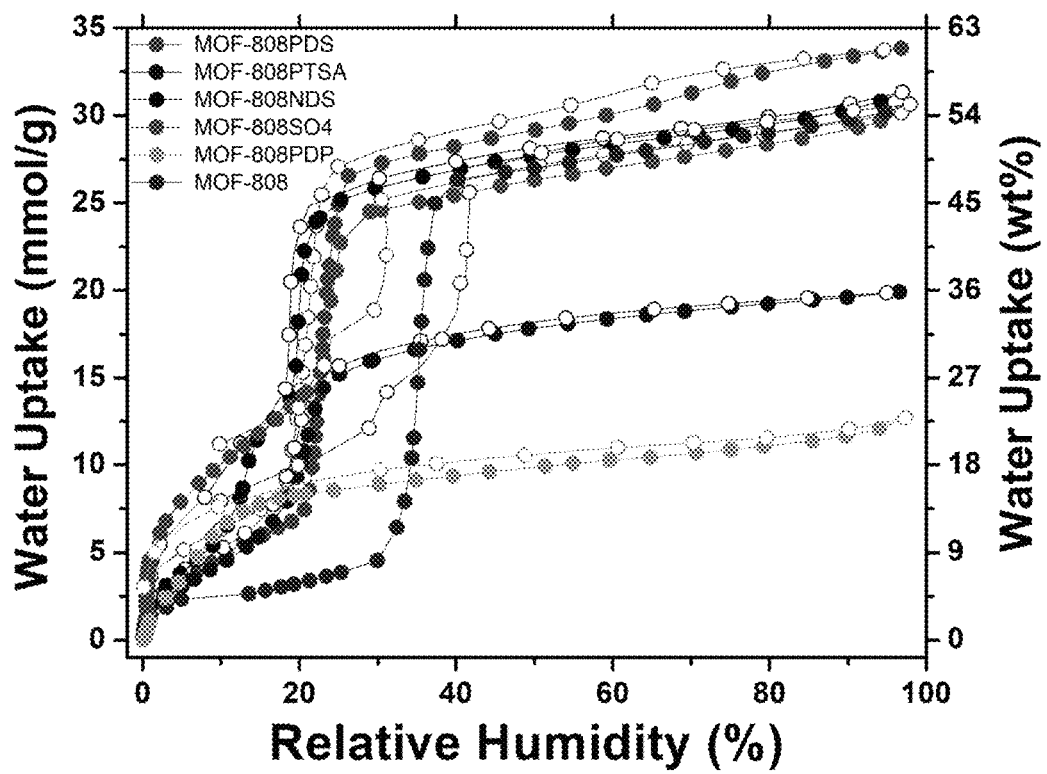

FIG. 2 shows water sorption isotherms at 298 K of MOF-808, MOF-808NDS, MOF-808PDS, MOF-808PTSA, MOF-808SO$_4$, MOF-808PDP.

Figure 3:
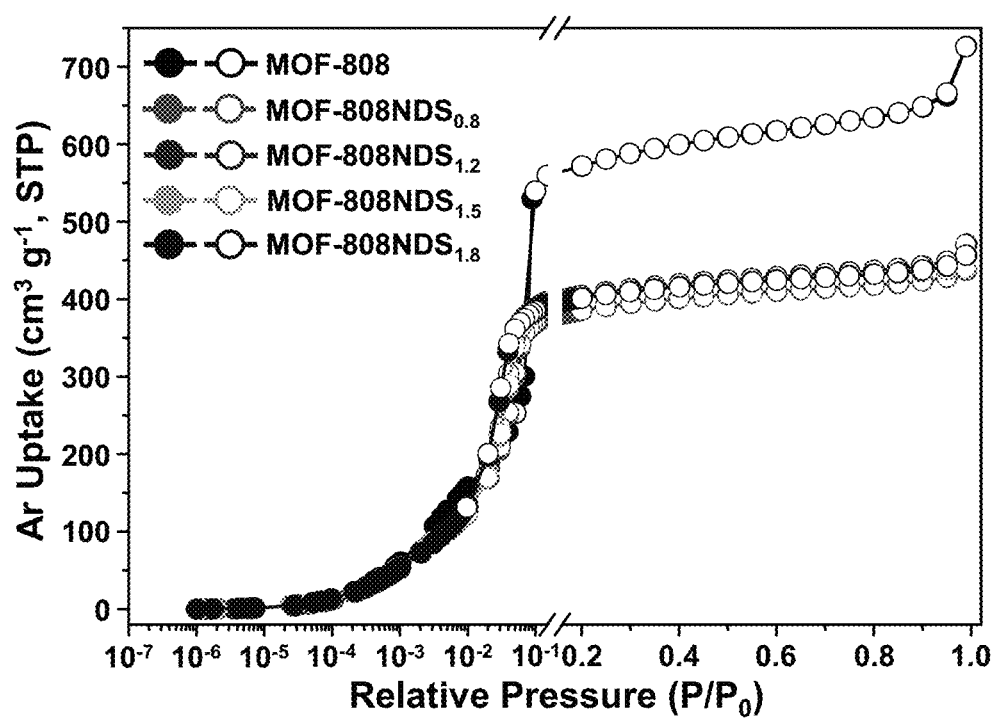

FIG. 3 shows an Ar isotherm of MOF-808, MOF-808NDS$_{0.8}$, MOF-808NDS$_{1.2}$, MOF-808NDS$_{1.5}$, and MOF-808NDS$_{1.8}$ materials at 87 K.

Figure 4:
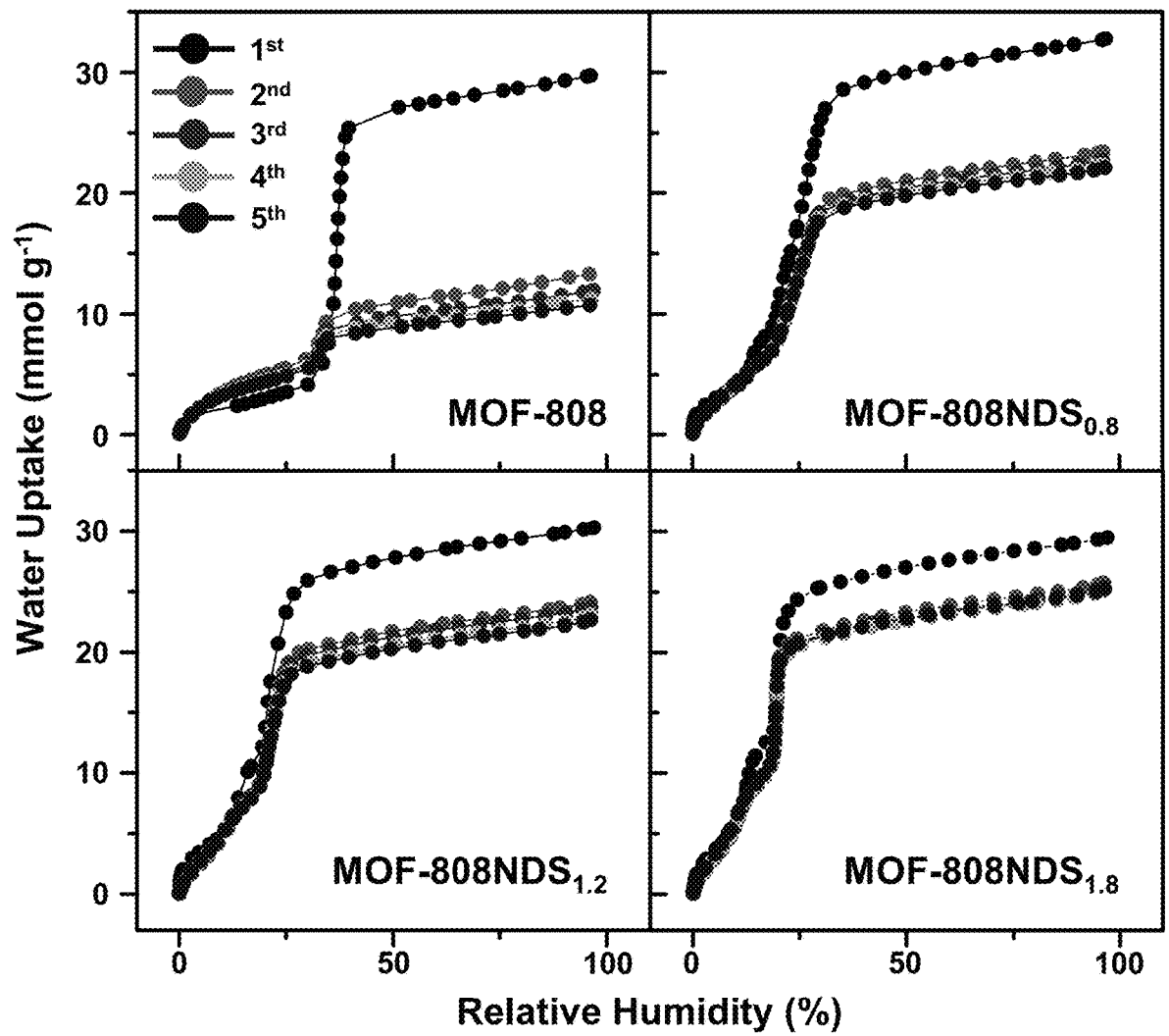

FIG. 4 shows water vapor isotherms of five regeneration cycles for MOF-808, MOF-808NDS$_{0.8}$, MOF-808NDS$_{1.2}$, and MOF-808NDS$_{1.8}$ materials at 25° C.

Figure 5:
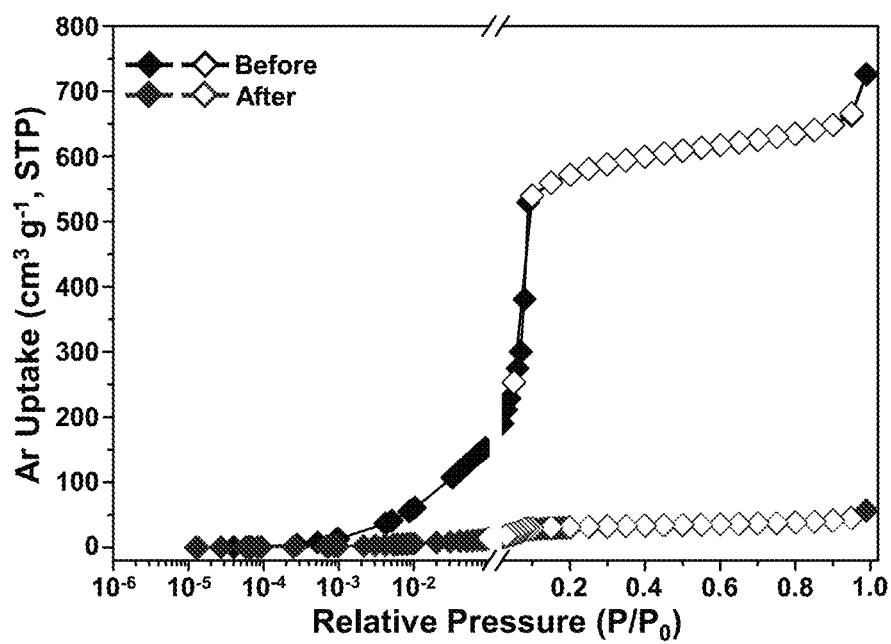

FIG. 5 is a 87 K Ar sorption isotherm of MOF-808 before and after five cycles of water sorption tests at 25° C.

FIG. 6A is an Ar sorption isotherm of MOF-808NDS$_{0.8}$ before and after five cycles of water sorption tests at 25° C.

FIG. 6B is an Ar sorption isotherm of MOF-808NDS$_{1.2}$ before and after five cycles of water sorption tests at 25° C.

FIG. 6C is an Ar sorption isotherm of MOF-808NDS$_{1.5}$ before and after five cycles of water sorption tests at 25° C.

FIG. 6D is an Ar sorption isotherm of MOF-808NDS$_{1.8}$ before and after five cycles of water sorption tests at 25° C.

Figure 7:
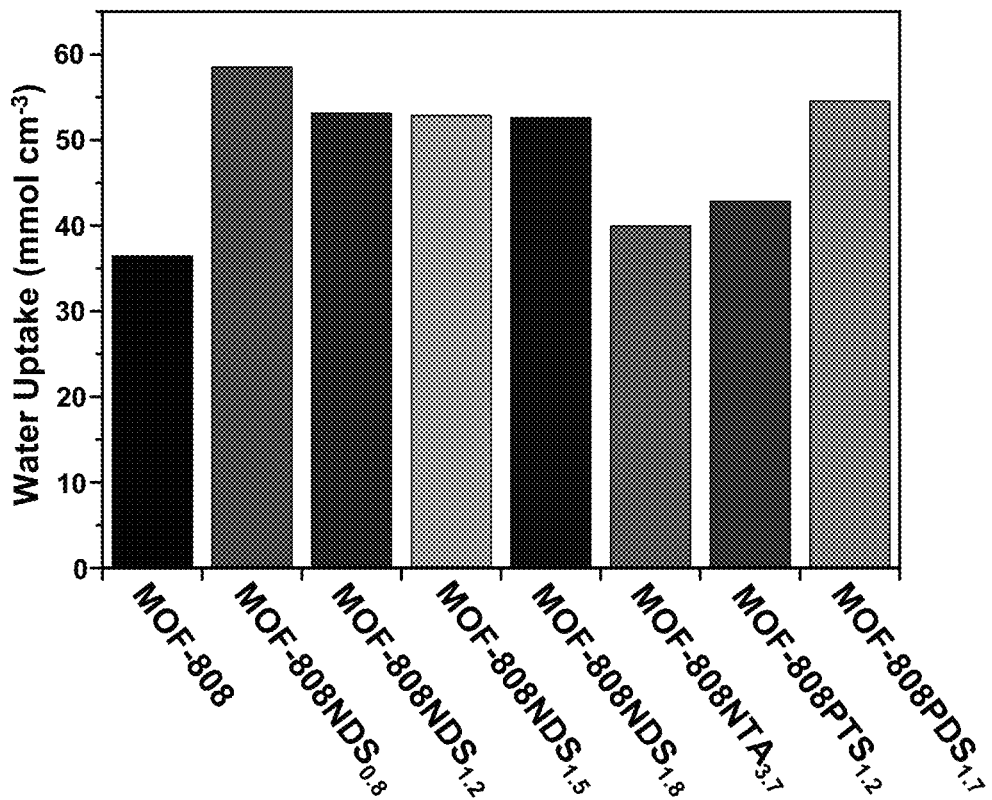

FIG. 7 illustrates comparisons of the water vapor uptake capacities of samples on the basis of the pore volume at their first cycles.

Figure 8A:
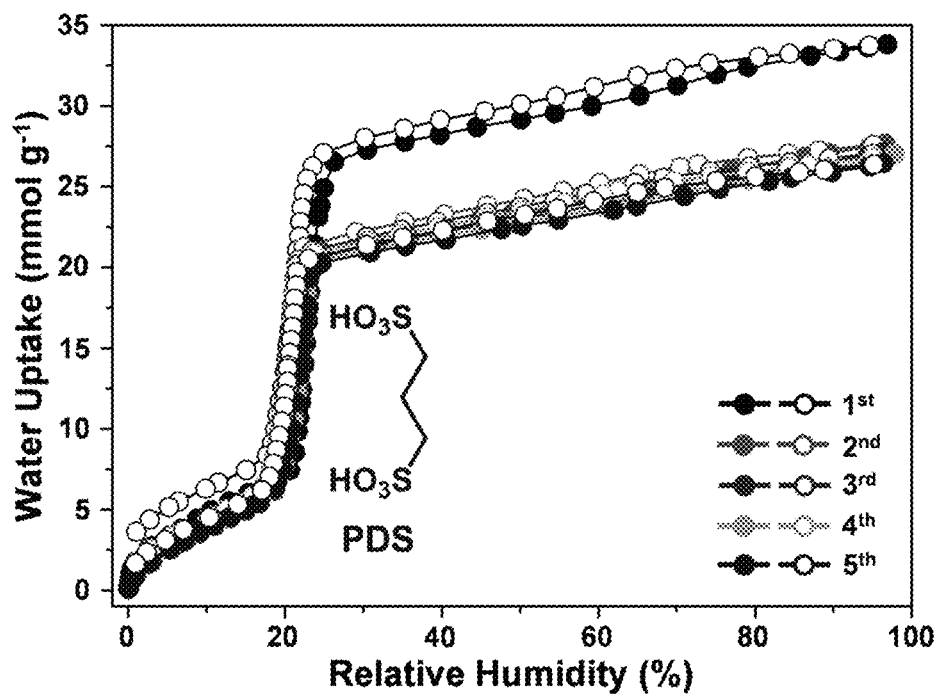

FIG. 8A illustrates water vapor isotherms of five regeneration cycles for MOF-808PDS$_{1.7}$ at 25° C. The closed and open symbols represent sorption and desorption, respectively.

Figure 8B:
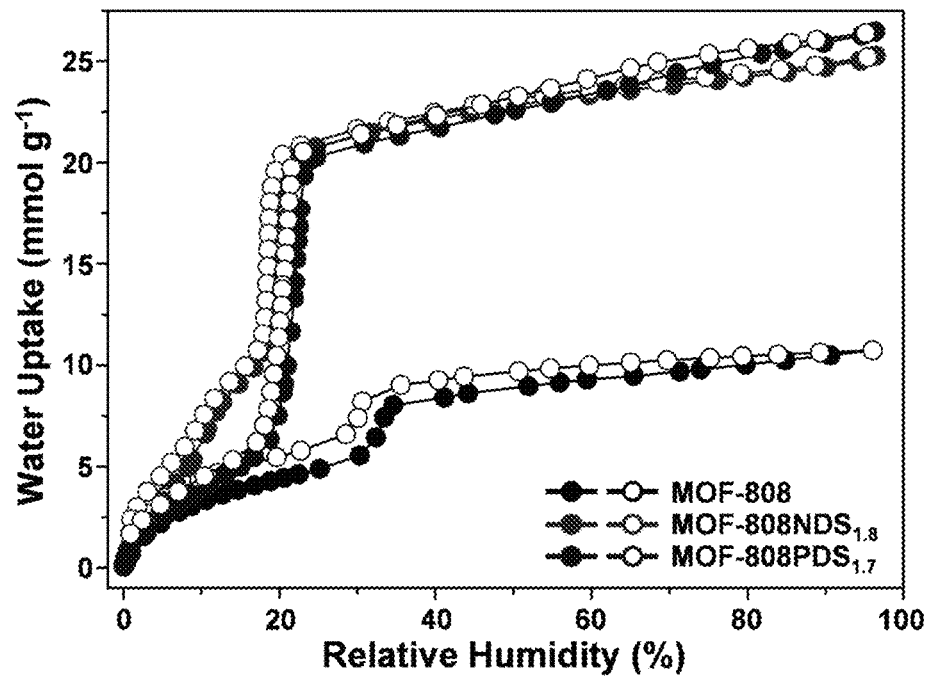

FIG. 8B is a comparison of water vapor isotherms of the fifth cycle for MOF-808, MOF-808PDS$_{1.7}$, and MOF-808NDS$_{1.8}$. The closed and open symbols represent sorption and desorption, respectively.

Figure 9A:
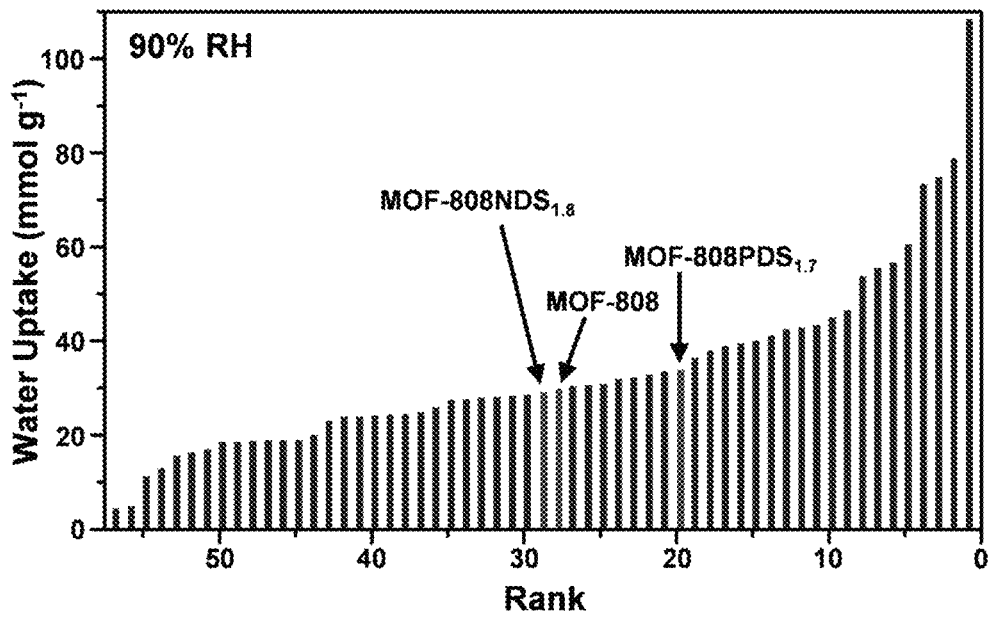

FIG. 9A is a comparison of the water uptakes of 57 porous materials at 90% RH at 25° C.

Figure 9B:
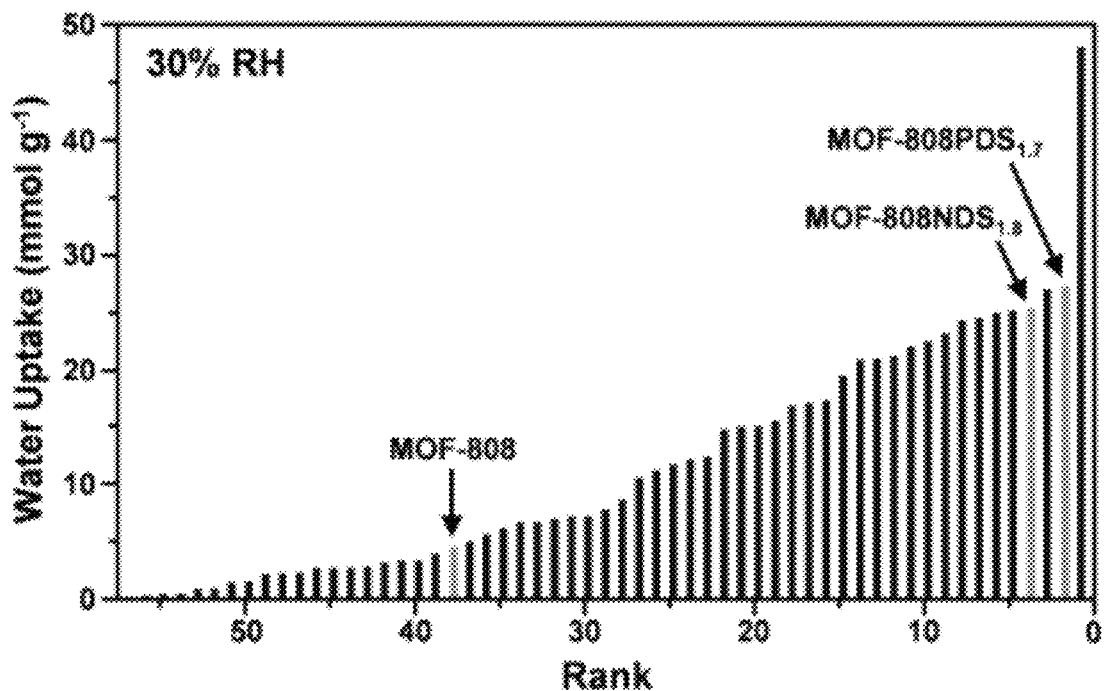

FIG. 9B is a comparison of the water uptakes of 57 porous materials at 30% RH at 25° C.

Figure 9C:
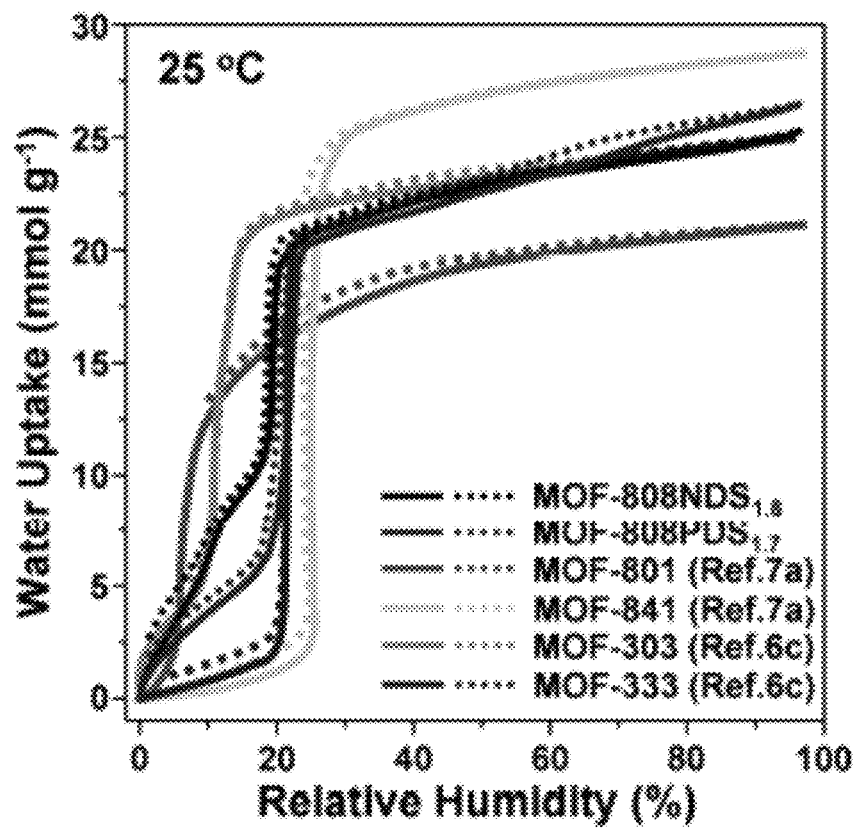

FIG. 9C shows stabilized water vapor isotherms of MOF-808PDS$_{1.7}$ and MOF-808NDS$_{1.8}$ compared with literatures at 25° C. The solid and dotted lines represent sorption and desorption, respectively.

DETAILED DESCRIPTION

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present disclosure. All publications, patent applications, patents, and other references mentioned herein are incorporated by reference in their entirety. The materials, methods, and examples disclosed herein are illustrative only and not intended to be limiting.

For purposes of this disclosure, the chemical elements are identified in accordance with the Periodic Table of the Elements, CAS version, Handbook of Chemistry and Physics, 75$^{th}$ Ed., inside cover, and specific functional groups are generally defined as described therein. Additionally, general principles of organic chemistry, as well as specific functional moieties and reactivity, are described in Sorrell, Organic Chemistry, 2$^{nd}$ edition, University Science Books, Sausalito, 2006; Smith, March's Advanced Organic Chemistry: Reactions, Mechanism, and Structure, 7$^{th}$ Edition, John Wiley & Sons, Inc., New York, 2013; Larock, Comprehensive Organic Transformations, 3$^{rd}$ Edition, John Wiley & Sons, Inc., New York, 2018; and Carruthers, Some Modern Methods of Organic Synthesis, 3$^{rd}$ Edition, Cambridge University Press, Cambridge, 1987; the entire contents of each of which are incorporated herein by reference.

"Substantially devoid" is defined herein to mean that none of the indicated substance is intentionally added or present. For example, less than about 1 wt %, preferably less than about 0.1 wt %, and even more preferably less than about 0.01 wt % of the indicated substance is present.

The term "about," when used in connection with one or more numbers or numerical ranges, should be understood to refer to all such numbers, including all numbers in a range and modifies that range by extending the boundaries slightly above and slightly below the numerical values set forth by, for example, +/−5%. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

The phrase "in one embodiment" or "in some embodiments" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "and" and "the" include plural references, i.e., "one or more," unless the context clearly dictates otherwise. The present disclosure also contemplates other embodiments "comprising," "consisting of" and "consisting essentially of," the embodiments or elements presented herein, whether explicitly set forth or not. Likewise, the term "include" and its grammatical variants are intended to be non-limiting, such that recitation of items in a list is not to the exclusion of other like items that can be substituted or added to the listed items.

As used herein, the term "metal-organic frameworks (MOFs)" refers to a class of compounds consisting of metal ions or clusters coordinated to organic ligands, including mono-, di-, tri-, or tetravalent organic ligands. The organic ligands also are referred to as linkers.

As used herein, the term "sulfonic acid" refers to a R—S(=O)$_2$—OH group, wherein R is an organic group including, but not limited to, straight-chained or branched $C_1$-$C_6$ alkyl, $C_6$-$C_{10}$ aryl, and the like.

As used herein, the term "sulfonate" refers to the salt or ester of a sulfonic acid and includes the functional group R—S(=O)$_2$—O$^-$.

The term "parent MOF" is used herein to indicate an unmodified MOF, i.e., an MOF that has not been modified by the presently disclosed methods.

As used herein, the term "carboxylic acid" refers to the —R(C=O)—OH group, wherein R is an organic group including, but not limited to, straight-chained or branched $C_1$-$C_6$ alkyl, $C_6$-$C_{10}$ aryl, and the like.

As used herein, the term "carboxylate" refers to the group —R(C=O)—O.

As used herein, the term "phosphonic acid" refers to the group —R(P=O)—(OH)$_2$.

The present disclosure addresses the pressing need in the field for discovering hydrophilic and stable MOF materials for water sorption-based technologies, including adsorptive heat transformation, and atmospheric water harvesting. Broadly, in a first aspect, a modified metal-organic framework (MOF) material is described, wherein a parent MOF is modified with a species including, but not limited to, at least one of a sulfonic acid group, a sulfonate group, and combinations thereof. The modified MOFs are relevant for applications including, but not limited to, humidity control, heat pumps, hydrolytic catalysis, chillers, and water harvesting from air.

In some embodiments of the first aspect, the parent MOF is a zirconium-based MOF. In some embodiments, the parent MOF is MOF-808 having the chemical formula $C_{24}H_{16}O_{32}Zr_6$ (see, FIG. 1B, left). In some embodiments of the first aspect, the parent MOF is a hafnium-based MOF.

In some embodiments of the first aspect, the modified MOF comprises a compound having a chemical formula of $Zr_6O_4(OH)_4L_n$ or $Hf_6O_4(OH)_4L_n$, or a combination thereof, wherein L represents a ligand, and n is the number of ligands, wherein the ligand L is selected from the group consisting of at least one of a sulfonic acid group, a sulfonate group, a carboxylate group, a hydroxyl group, water, and combinations thereof. In some embodiments, the parent MOF comprises carboxylate ligands, hydroxyl ligands, and water ligands, and the modifications described herein add at least one of a sulfonic acid ligand, a sulfonate ligand, and combinations thereof, to the parent MOF while removing some amount of the carboxylate ligands, e.g., formate ligands, from the parent MOF. In other words, in some embodiments, the modified MOF has less carboxylate ligands, and more of at least one of a sulfonic acid ligand, a sulfonate ligand, and combinations thereof, than the parent MOF.

In some embodiments of the first aspect, the MOF has the chemical formula $Zr_6(\mu_3\text{-}O)_4(\mu_3\text{-}OH)_4(BTC)_2(L)_x(HCOO)_y\cdot(OH)_{6-x-y}(H_2O)_{6-x-y}$, wherein L is a ligand selected from the group consisting of at least one of a sulfonic acid group, a sulfonate group, and combinations thereof. In some embodiments, x is a value greater than 0 (zero) and less than or equal to 6 and y=6−x. In some embodiments, x is a value between about 0.5 and 4. In some embodiments, x is a value between about 0.8 and 3.5. In some embodiments, x is a value about 0.8 and 2.5. It should be appreciated by the person skilled in the art that the generalized trend is the higher the x value, the more water stable the MOF material and the higher percentage of the material's original capacity (in the 1st cycle) that can be retained, however, with a higher x, a lower absolute capacity in the 1st cycle is expected due to smaller pore volume (see, e.g., FIG. 1C with MOF-808NDS$_{0.8}$ having the higher capacity in the 1st cycle). In some embodiments, the value of x in the MOF is fine tuned to maximize the water stability and absolute capacity. In some embodiments, the value of x in the MOF is fine tuned to maximize the water stability. In some embodiments, the value of x in the MOF is fine tuned to maximize the absolute capacity.

In some embodiments, the at least one sulfonic acid group, at least one sulfonate group, or combinations thereof, are selected from:

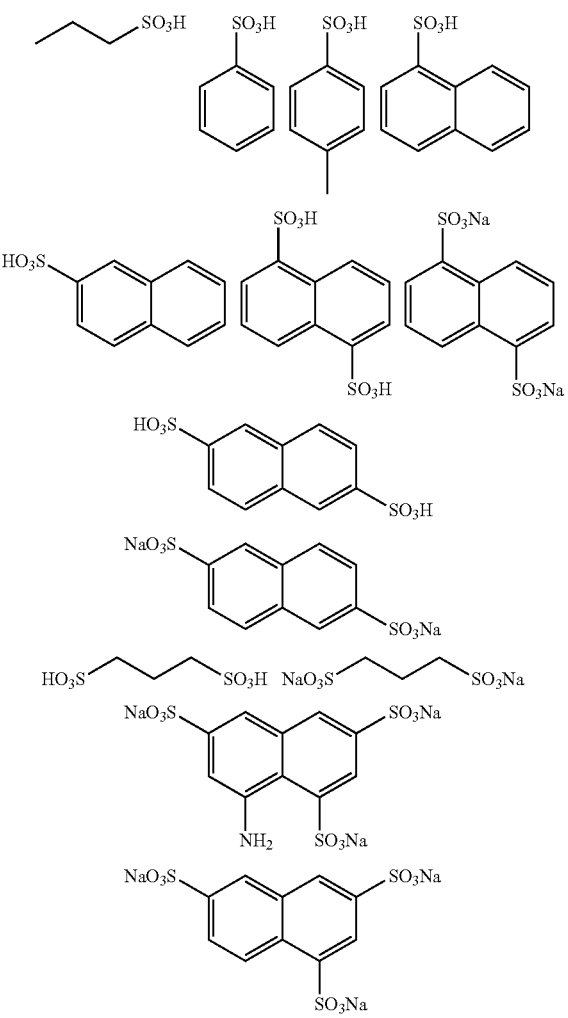

-continued

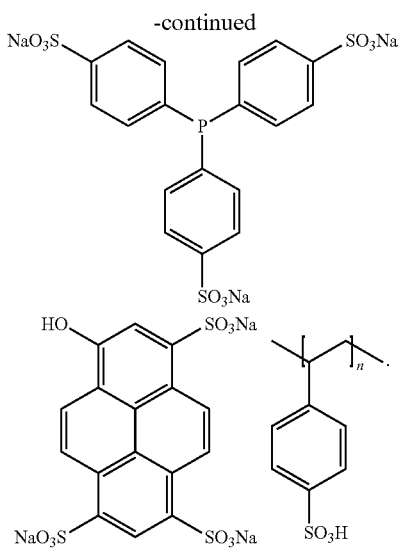

In some embodiments, the modifying species includes, but is not limited to, 1,5-naphthalenedisulfonic acid tetrahydrate (NDS), 1,3-propanedisulfonic acid (PDS), p-toluenesulfonic acid monohydrate (PTS), and 1,5-Naphthalenedisulfonic acid disodium salt hydrate (NDSNa). In some embodiments, the MOFs are modified by NDS. In some embodiments, the MOFs are modified by PDS. In some embodiments, the MOFs are modified by PTS. In some embodiments, the MOFs are modified by NDSNa.

In some embodiments of the first aspect, MOF-808 modified with 1,5-naphthalenedisulfonic acid has between 1 to 96 molecules, or more, of 1,5-naphthalenedisulfonic acid per crystallographic unit cell. In some embodiments, MOF-808 modified with 1,3-propanedisulfonic acid has between 1 to 96 molecules, or more, of 1,3-propanedisulfonic acid per crystallographic unit cell. In certain embodiments, MOF-808 modified with p-toluenesulfonic acid has between 1 to 96 molecules, or more, of p-toluenesulfonic acid per crystallographic unit cell.

In some embodiments of the first aspect, the metal organic framework is not modified by adding any of free halide ions (e.g., F$^-$, Cl$^-$, Br$^-$, I$^-$), trimethylsilyl triflate (Me$_3$SiOTf), carboxylic acid groups, perfluorinated carboxylic acid groups, carboxylate groups, or phosphonic acid groups to the parent MOF.

In some embodiments of the first aspect, the modified MOF of the first aspect has at least one of (i) an enhanced hydrophilicity and water stability compared to the parent MOF at relative humidity less than about 30% and ambient temperature (about 20-25° C.), (ii) preserved crystallinity after the PSM relative to the parent MOF, (iii) a reduced porosity after PSM relative to the parent MOF while having a substantially similar water vapor uptake capacity; and (iv) a substantially reversible desorption. In some embodiments, the modified MOF has a stepped isotherm below about 30% RH, revealing the improved hydrophilicity of the modified MOF relative to the parent MOF. In some embodiments, the modified MOF has a stepped isotherm below about 25% RH, revealing the improved hydrophilicity of the modified MOF relative to the parent MOF. In some embodiments, the pore volume of the modified MOF is about 10%, about 15%, about 20% or about 25% less than the pore volume of the parent MOF, while the maximum water vapor uptake capacity is within +/−10% or +/−5% of the maximum water vapor uptake capacity of the parent MOF. In some embodiments, the maximum water vapor uptake capacity (i.e., working capacity) was greater than about 20 mmol g$^{-1}$ at less than 30% RH. In some embodiments, the maximum water vapor uptake capacity (i.e., working capacity) was greater than about 25 mmol g$^{-1}$ at less than 30% RH. In some embodiments, the maximum water vapor uptake capacity (i.e., working capacity) was greater than about 30 mmol g$^{-1}$ at less than 30% RH.

In some embodiments of the first aspect, the modified MOF (MOF-808NDS and MOF-808PDS) simultaneously exhibits: (i) an enhancement of hydrophilicity as evidenced by a 50%, a 100%, a 150%, a 200%, a 250%, a 300%, a 350%, a 400%, a 450%, a 500%, or a 540% increase of water sorption compared to the parent MOF at 25% relative humidity and 298 K; and (ii) an increased stability compared to the parent MOF as evidenced by one or more of: (a) no more than a 5% loss of X-ray Diffraction (XRD) crystallinity; (b) loss of water sorption capacity less than about 20% after the first sorption/desorption cycle; and (c) no more than about 5% of additional loss of water sorption capacity for at least 4 additional sorption/desorption cycles (after the first sorption/desorption cycle); wherein the parent MOF does not exhibit such stability.

In some embodiments of the first aspect, the modified MOF (MOF-808PTSA) simultaneously exhibits: (i) an enhancement of hydrophilicity as evidenced by a 50%, a 100%, a 150%, a 200%, a 250%, or a 280% increase of water sorption compared to the parent MOF at 25% relative humidity and 298 K; and (ii) an increased stability compared to the parent MOF as evidenced by one or more of: (a) no more than a 5% loss of X-ray Diffraction (XRD) crystallinity; (b) loss of water sorption capacity less than 20% after the first sorption/desorption cycle; and (c) no more than about 5% of additional loss of water sorption capacity for at least 4 additional sorption/desorption cycles (after the first sorption/desorption cycle); wherein the parent MOF does not exhibit such stability.

In a second aspect, a method for post-synthetic modification of metal-organic frameworks (MOFs) is described, the method comprising contacting a parent MOF with an organic molecule comprising at least one of a sulfonic acid group, a sulfonate group, or combinations thereof, to form a modified MOF described in the first aspect. In the method of the second aspect, the organic molecule interacts with the metal clusters of the MOF. In some embodiments, the method of the second aspect is a single step method comprises contacting a metal-organic framework compound with a solution of one or more sulfonic acids, one or more sulfonates, or combinations thereof. In some embodiments, the method of the second aspect does not include a step of reacting the parent MOF with hydrochloric acid before reacting with the solution of one or more sulfonic acids, one or more sulfonates, or combinations thereof. In some embodiments, the parent MOF comprises carboxylate ligands, hydroxyl ligands, and water ligands, and the modifications described herein add at least one of a sulfonic acid ligand, a sulfonate ligand, and combinations thereof, to the parent MOF while removing some amount of the carboxylate ligands, e.g., formate ligands, from the parent MOF. In some embodiments of the second aspect, the metal organic framework is not modified by adding any of free halide ions (e.g., F$^-$, Cl$^-$, Br$^-$, I$^-$), trimethylsilyl triflate (Me$_3$SiOTf), carboxylic acid groups, perfluorinated carboxylic acid groups, carboxylate groups, or phosphonic acid groups to the parent MOF.

In some embodiments of the second aspect, the method for post-synthetic modification of MOFs comprises: (a)

adding the parent MOF to a solution of the organic molecule for a period of time to form a modified MOF described in the first aspect, wherein the organic molecule comprises at least one of a sulfonic acid group, a sulfonate group, or combinations thereof; (b) separating the modified MOF from the solution through centrifugation or filtration; (c) washing the modified MOF with one or more solvents; and (d) optionally repeating step (b). The solvent for the solution comprising the organic molecule includes, but is not limited to, water, dimethylformamide (DMF), dimethyl sulfoxide (DMSO), dimethylacetamide (DMA), diethyl formamide (DEF), N-Methyl-2-pyrrolidone (NMP), and any combination thereof.

In a third aspect, a method for simultaneously enhancing water stability and hydrophilicity of MOFs for water sorption-based applications is described, said method comprising contacting a parent MOF with an organic molecule comprising at least one of a sulfonic acid group, a sulfonate group, or combinations thereof, to form a modified MOF described in the first aspect, wherein the modified MOF has enhanced water stability and hydrophilicity relative to the parent MOF. The modified metal organic frameworks exhibit superior water uptake capacities at lower RH levels and improved recycling performance over multiple sorption/desorption cycles. In the method of the third aspect, the organic molecule interacts with the metal clusters of the MOF. In some embodiments, the method of the third aspect is a single step method comprises contacting a metal-organic framework compound with a solution of one or more sulfonic acids, one or more sulfonates, or combinations thereof. In some embodiments, the method of the third aspect does not include a step of reacting the parent MOF with hydrochloric acid before reacting with the solution of one or more sulfonic acids, one or more sulfonates, or combinations thereof. In some embodiments, the parent MOF comprises carboxylate ligands, hydroxyl ligands, and water ligands, and the modifications described herein add at least one of a sulfonic acid ligand, a sulfonate ligand, and combinations thereof, to the parent MOF while removing some amount of the carboxylate ligands, e.g., formate ligands, from the parent MOF. In some embodiments of the third aspect, the metal organic framework is not modified by adding any of free halide ions (e.g., $F^-$, $Cl^-$, $Br^-$, $I^-$), trimethylsilyl triflate ($Me_3SiOTf$), carboxylic acid groups, perfluorinated carboxylic acid groups, carboxylate groups, or phosphonic acid groups to the parent MOF.

In some embodiments of the third aspect, the method for simultaneously enhancing water stability and hydrophilicity of MOFs for water sorption-based applications comprises: (a) adding the parent MOF to a solution of the organic molecule for a period of time to form a modified MOF described in the first aspect, wherein the organic molecule comprises at least one of a sulfonic acid group, a sulfonate group, or combinations thereof; (b) separating the modified MOF from the solution through centrifugation or filtration; (c) washing the modified MOF with one or more solvents; and (d) optionally repeating step (b).

Advantageously, the modified MOFs described herein are effective at water harvesting from low relative humidity (e.g., less than about 30% RH) air, all while demonstrating the following characteristics: hydrolytic and mechanical stability; high water vapor uptake capacity (i.e., working capacity); substantially eliminated sorption/desorption isotherm hysteresis; and vapor capture/water release recyclability at ambient temperatures.

The presently disclosed subject matter now will be described more fully hereinafter with reference to the accompanying Figures, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

Example 1

Methods and Materials for Examples 1 and 2

Benzene-1,3,5-tricarboxylic acid (BTC, 95%), $ZrOCl_2 \cdot 8H_2O$ (98%), N,N-dimethylformamide (DMF, 98%), 1,5-naphthalenedisulfonic acid (NDS) tetrahydrate (97%), 1-naphthoic acid (NTA, 96%), p-toluenesulfonic acid (PTS) monohydrate (98.5%), 1,3-propanedisulfonic acid (PDS, 70% in water), 1,5-Naphthalenedisulfonic acid disodium salt hydrate (NDSNa) and 1,4-Phenylenediphosphonic acid (PDP) were purchased from Sigma Aldrich. Formic acid (97%, Alfa Aesar) and acetone (99.5%, Alfa Aesar) were used.

All purchased chemicals were used without further purification except where otherwise noted. Ultrapure water (18.2 MΩ) was obtained from a Millipore® Simplicity® water system. MOF-808 was synthesized according to a literature method (Jiang et al., 2014).

Powder X-ray diffraction (PXRD) patterns were collected using a Rigaku MiniFlex powder X-ray diffractometer at 40 kV, 15 mA using a Cu Kα source (λ=1.5406 Å) in a 2 theta range of 3 to 30° at a step size of 0.02° and a scan rate of 5°/min. The simulated powder pattern of MOFs were calculated using Mercury 3.8 and CIF files.

$^1$H NMR spectra were collected using Bruker Avance III 400 MHz spectrometers. To prepare samples for $^1$H NMR measurements, ca. 5 mg of samples was digested in DMSO-$d_6$ (600 μL) and 48 wt % hydrofluoric acid (20 μL). Chemical shifts are in parts per million (ppm).

Argon sorption isotherms at 87 K were measured using an Anton Paar Autosorb iQ-XR instrument equipped with a CryoSync Accessory. Prior to sorption tests, 20-35 mg of powder samples were degassed at room temperature for 6 hrs and 150° C. for 12 hrs with a ramping rate of 2° C. $min^{-1}$.

Water vapor sorption isotherms were measured using a vapor sorption analyzer (Vstar, Quantachrome) at 25-70° C. For cyclic water vapor sorption measurements, samples were regenerated under vacuum at 25° C. for 3 hrs.

Infrared (IR) spectra for dehydration were collected for MOF-808 samples on a Nicolet™ iS50 Fourier transform-infrared spectroscopy (FT-IR) spectrometer with a Hg—Cd—Te (MCT, cooled to 77 K by liquid $N_2$) detector by averaging 128 scans at 2 $cm^{-1}$ resolution in the 600–4000 $cm^{-1}$ range and were taken relative to an empty cell background reference collected under dynamic vacuum (ca. 0.01 Torr) at 150° C. Self-supporting wafers (0.01-0.03 g $cm^{-2}$, with a diameter of 13 mm) were sealed within an IR transmission cell with ZnSe windows (High Temperature Transmission Cell, Harrick Scientific Products Inc.). Wafer temperatures were measured by K-type thermocouples (Omega) attached to the sample holder. The IR cell was connected to a glass vacuum manifold, which was used to achieve pretreatment at vacuum conditions. The temperature program followed for these measurements is described herein: the temperature of the cell was first raised from ambient temperature to 150° C. at a ramping rate of 0.033° C. s$^{-1}$ followed by holding temperature at 150° C. for water removal until invariance among successive spectra recorded.

Synthesis of Modifed MOFs

MOF-808PTS$_{3.8}$: 95 mg (0.5 mmol) of PTS was dissolved in DMF (10 mL) and then 100 mg of dried MOF-808 was added. The mixture was left at room temperature in a capped pyrex vial for 24 hrs without stirring. The mixture was then centrifuged. After removing the supernatant, the precipitate was copiously washed with DMF (4×, 20 mL each time) and acetone (4×, 20 mL each time). Powder X-ray diffraction (PXRD) patterns of the sample were collected to confirm its crystallinity. Argon sorption isotherm of the sample was measured at 87 K. Approximately 5 mg of sample powder was digested in DMSO-d$_6$ (600 μL) and hydrofluoric acid (20 μL). The solution was used for $^1$H NMR to determine the loading of p-toluenesulfonic acid in MOF-808PTS. It was determined that approximately 3.8 p-toluenesulfonic acid molecules were incorporated per Zr$_6$ cluster (data not shown).

MOF-808PDS$_{1.7}$: 110 μL of diluted of PDS (70% in water) was dissolved in D.I. water (5 mL) and then 50 mg of dried MOF-808 was added. The mixture was left at room temperature in a capped pyrex vial for 24 hrs without stirring. The mixture was then centrifuged. After removing the supernatant, the precipitate was copiously washed with water (4×, 20 mL each time) and acetone (4×, 20 mL each time). Powder X-ray diffraction (PXRD) patterns of the sample were collected to confirm its crystallinity. Argon sorption isotherm of the sample was measured at 87 K. Approximately 5 mg of sample powder was digested in DMSO-d$_6$ (600 μL) and hydrofluoric acid (20 μL). The solution was used for $^1$H NMR to determine the loading of 1,3-propanedisulfonic acid in MOF-808PDS. It was determined that approximately 1.7 1,3-propanedisulfonic acid molecules were incorporated per Zr$_6$ cluster (data not shown).

MOF-808NDS$_{1.7}$: 1,5-Naphthalenedisulfonic acid tetrahydrate (540 mg, 1.5 mmol) was dissolved in ultrapure water (30 mL). To this solution was then added vacuum dried MOF-808 (100 mg). The mixture was gently stirred with a stir bar at 60 rpm for 24 hrs. The suspension was then centrifuged. After removing the supernatant, the precipitate was copiously washed with water (4×, 20 mL each time) and acetone (4×, 20 mL each time). PXRD patterns of the sample were collected to confirm its crystallinity. Argon sorption isotherm of the sample was measured at 87 K. Approximately 5 mg of sample powder was digested in deuterated dimethyl sulfoxide (DMSO-d$_6$) (600 μL) and hydrofluoric acid (20 μL). The solution was used for $^1$H NMR to determine the loading of 1,5-Naphthalenedisulfonic acid in MOF-808NDS. It was determined that approximately 1.7 1,5-naphthalenedisulfonic acid molecules were incorporated per Zr$_6$ cluster (data not shown).

MOF-808NDSNa$_{1.2}$: 1,5-Naphthalenedisulfonic acid disodium salt hydrate (332 mg) was dissolved in ultrapure water (10 mL). To this solution was then added vacuum dried MOF-808 (100 mg). The mixture was gently stirred with a stir bar at 60 rpm for 24 hrs. The suspension was then centrifuged. After removing the supernatant, the precipitate was copiously washed with water (4×, 20 mL each time) and acetone (4×, 20 mL each time). Powder X-ray diffraction (PXRD) patterns of the sample were collected to confirm its crystallinity. Argon sorption isotherm of the sample was measured at 87 K. Approximately 5 mg of sample powder was digested in DMSO-d$_6$ (600 μL) and hydrofluoric acid (20 μL). The solution was used for $^1$H NMR to determine the loading of 1,5-Naphthalenedisulfonic acid disodium in MOF-808NDSNa. It was determined that approximately 1.2 1,5-naphthalenedisulfonic acid disodium molecules were incorporated per Zr$_6$ cluster (data not shown).

MOF-808PDP$_{3.2}$: 1,4-Phenylenediphosphonic acid (119 mg, 0.5 mmol) was dissolved in ultrapure water (5 mL). To this solution was then added vacuum dried MOF-808 (50 mg). The mixture was gently stirred with a stir bar at 60 rpm for 24 hrs. The suspension was then centrifuged. After removing the supernatant, the precipitate was copiously washed with water (4×, 20 mL each time) and acetone (4×, 20 mL each time). Powder X-ray diffraction (PXRD) patterns of the sample were collected to confirm its crystallinity. Argon sorption isotherm of the sample was measured at 87 K. Approximately 5 mg of sample powder was digested in DMSO-d$_6$ (600 μL) and hydrofluoric acid (20 μL). The solution was used for 1H NMR to determine the loading of 1,4-phenylenediphosphonic acid in MOF-808PDP. It was determined that approximately 3.2 1,4-phenylenediphosphonic acid molecules were incorporated per Zr$_6$ cluster (data not shown).

Analysis

Prior to isotherm measurement, an empty glass sample cell was weighed first. Approximately 50 mg of samples is then loaded into the glass sample cell, and heated under dynamic vacuum from room temperature to 150° C. The sample cell with sample is weighed, and empty cell weight subtracted, to obtain the accurate mass of the sample. Water vapor sorption isotherms are then measured on an Anton Paar Autosorb Vstar 2 turbo instrument at 298 K or 313 K.

Water vapor isotherms at 298 K of freshly degassed samples MOF-808 (prepared according to Jiang et al., 2014), MOF-808NDS, MOF-808PDS, MOF-808PTSA, MOF-808PDP and MOF-808SO$_4$ (Jiang et al., 2014) were measured and compared to demonstrate MOF-808NDS is more hydrophilic than unmodified MOF-808. See FIG. 2.

PXRD patterns of MOF-808, MOF-808NDS, MOF-808PDS, MOF-808PTSA, MOF-808PDP and MOF-808SO$_4$ were also obtained and compared. Only MOF-808NDS, MOF-808PDS and MOF-808PTSA, exhibited a PXRD patterns indistinguishable from the fresh samples, while MOF-808, MOF-808PDP, MOF-808SO$_4$ all exhibited severe deterioration in their x-ray diffractions, indicative of the superior water stability of MOF-808NDS, MOF-808PDS and MOF-808PTSA, has been achieved through modification using sulfonic acids (data not shown).

Water vapor isotherms at 298 K, and 313 K of freshly degassed samples MOF-808NDS and MOF-808 (prepared according to Jiang et al., 2014), and water vapor isotherms at 298 K of MOF-808PDS and MOF-808PTSA, were measured for several cycles, and compared as evidence that the MOF-808NDS, MOF-808PDS and MOF-808PTSA achieved greater stability and recyclability than unmodified MOF-808 for water sorption-based applications. For example, MOF-808NDS, MOF-808PDS and MOF-808PTSA exhibit recyclable water sorption performance with only less than 20% loss of maximum capacity between the 1$^{st}$ and 2$^{nd}$ water sorption isotherm cycles and a steady capacity after the 1st cycle (data not shown). In comparison, the unmodified MOF-808 loses more than 50% of its maximum capacity between the 1$^{st}$ and 2$^{nd}$ water sorption isotherm cycles with the capacity continuing to deteriorate in the following cycles (data not shown). For sample regeneration between isotherm cycles, the samples were evacuated under dynamic vacuum at room temperature for 2 hours.

X-ray diffraction patterns and water sorption isotherm data together indicate that the modification of MOF-808 using 1,5-naphthalenedisulfonic acid, or 1,3-propanedisulfonic acid or p-toluenesulfonic acid monohydrate simultaneously enhances hydrophilicity and water stability.

Example 2

This example details the method for modifying MOFs using sulfonic acid group-containing molecules, sulfonate group-containing molecules, and phosphonic acid group-containing molecules, based on the findings of Example 1.

Synthesis of MOF-808

For the synthesis of MOF-808, $H_3BTC$ (420 mg, 2 mmol), $ZrOCl_2 \cdot 8H_2O$ (1940 mg, 6 mmol), 90 mL of DMF, and 90 mL of formic acid were added to a 250 mL glass jar. The mixture was sonicated until the solids were completely dissolved. The mixture solution was heated in a 130° C. oven for 48 hrs. White precipitate was collected via centrifugation and washed four times with fresh DMF (40 mL) followed by washing five times with fresh acetone (40 mL). The sample was transferred to a 20 mL glass vial and stored by dispersing it in 10 mL of acetone until conducting characterizations. To dry the sample, the suspension was transferred into a centrifuge tube and centrifugated at $11,180 \times g_n$ for 5 min. After the centrifugation, most of the acetone supernatant was removed. Then, the precipitate was dried at 70° C. for 12 hrs under reduced pressure. The yield of the collected powder was ca. 1 g.

1.3 Post-Synthetic Modification of MOF-808

A proportionate amount of dried MOF-808 (theoretical unit formula: $Zr_6O_4(OH)_4(BTC)_2(HCOO)_6$, MW=1363) was added to an aqueous solution of ligands (i.e., NDS, NTA, PTS, and PDS) in a 20 mL glass vial. The reaction parameters (i.e., volume and concentration of the solution, and reaction temperature) were adjusted for different loadings and ligand types in modified MOF-808. The modified MOF-808 samples and their formula are listed in Table 1. After reactions, the aqueous supernatant was removed by centrifugation at $11,180 \times g$ for 5 min. The precipitate was washed four times with D.I. water (20 mL) and five times with acetone (20 mL). The sample was stored in a glass vial containing 10 mL of acetone. The modified MOF-808 samples were dried as described hereinabove for MOF-808.

MOF-808NDS$_{0.8}$: 14 mg (0.039 mmol) of NDS was dissolved in D.I. water (5 mL) and then 75 mg of dried MOF-808 was added. The mixture was stirred using a magnetic stir bar at 60 rpm and room temperature in a capped Pyrex vial for 24 hrs.

MOF-808NDS$_{1.2}$: 36 mg (0.1 mmol) of NDS was dissolved in D.I. water (10 mL) and then 100 mg of dried MOF-808 was added. The mixture was stirred using a magnetic stir bar at 60 rpm and room temperature in a capped Pyrex vial for 24 hrs.

MOF-808NDS$_{1.5}$: 270 mg (0.75 mmol) of NDS was dissolved in D.I. water (15 mL) and then 150 mg of dried MOF-808 was added. The mixture was stirred using a magnetic stir bar at 60 rpm and room temperature in a capped Pyrex vial for 24 hrs.

MOF-808NDS$_{1.8}$: 360 mg (1 mmol) of NDS was dissolved in D.I. water (20 mL) and then 100 mg of dried MOF-808 was added. The mixture was heated in a capped pyrex vial in a 50° C. oven for 24 hrs without stirring.

MOF-808NTA$_{3.7}$: 172 mg (1 mmol) of NTA was dissolved in DMF (10 mL) and then 100 mg of dried MOF-808 was added. The mixture was heated in a capped pyrex vial in a 50° C. oven for 24 hrs without stirring.

MOF-808PTS$_{1.2}$: 95 mg (0.5 mmol) of PTS was dissolved in D.I. water (10 mL) and then 100 mg of dried MOF-808 was added. The mixture was left at room temperature in a capped pyrex vial for 24 hrs without stirring.

Results and Discussion

MOF-808 consists of large cavities of 1.8 nm diameter with a large pore volume of ca. 0.85 cm$^3$ g$^{-1}$ (FIG. 1A) (H. Furukawa et al., 2014). Its secondary building units (SBUs) contain the iconic $Zr_6(\mu_3\text{-}O)_4(\mu_3\text{-}OH)_4(COO)_{12}$ clusters and benzene-1,3,5-tricarboxylate (BTC) linkers (FIG. 1A) (Id.). Six of the coordinating carboxylates in the SBU come from the BTC linkers, while the other six are from formate ligands (FIG. 1B, left). The maximum water vapor uptake of the synthesized MOF-808 was ca. 30.6 mmol g$^{-1}$ at 25° C., comparable with the reported value of ca. 33 mmol g$^{-1}$ (FIG. 1C) (H. Furukawa et al., 2014; X. Liu et al., 2021). The hydrophilicity of sorbent materials can be determined by the RH (or equivalently the water vapor pressure) at which the sorption isotherm exhibits a sorption step that reveals a sudden increase in water sorption; the more hydrophilic the sorbent, the lower the RH the sorption step is (N. C. Burtch et al., 2014). The sorption step accounting for most of the water sorption capacity of unmodified MOF-808 occurs between 35-40% RH (FIG. 1C). According to de Lange et al., this is outside the preferred 5-30% RH window, indicating insufficient hydrophilicity of MOF-808 for AWH and AHT applications. Distinct differences can be noted between the sorption and desorption branches of MOF-808 water sorption isotherm, with the desorption branch showing reduced water sorption at ca. 45% RH compared to the

TABLE 1

List of modified MOF-808 samples.

| Sample | Formula |
| --- | --- |
| MOF-808NDS$_{0.8}$ | $Zr_6O_4(OH)_4(BTC)_2(HCOO)_{3.22}(NDS)_{0.79}(H_2O)_{1.99}(OH)_{1.99}$ |
| MOF-808NDS$_{1.2}$ | $Zr_6O_4(OH)_4(BTC)_2(HCOO)_{2.46}(NDS)_{1.20}(H_2O)_{2.34}(OH)_{2.34}$ |
| MOF-808NDS$_{1.5}$ | $Zr_6O_4(OH)_4(BTC)_2(HCOO)_{2.12}(NDS)_{1.55}(H_2O)_{2.33}(OH)_{2.33}$ |
| MOF-808NDS$_{1.8}$ | $Zr_6O_4(OH)_4(BTC)_2(HCOO)_{1.65}(NDS)_{1.75}(H_2O)_{2.60}(OH)_{2.60}$ |
| MOF-808NTA$_{3.7}$ | $Zr_6O_4(OH)_4(BTC)_2(HCOO)_{1.81}(NTA)_{3.72}(H_2O)_{0.47}(OH)_{0.47}$ |
| MOF-808PTS$_{1.2}$ | $Zr_6O_4(OH)_4(BTC)_2(HCOO)_{2.47}(PTS)_{1.18}(H_2O)_{2.35}(OH)_{2.35}$ |
| MOF-808PTS$_{3.9}$ | $Zr_6O_4(OH)_4(BTC)_2(HCOO)_{1.47}(PTS)_{3.82}(H_2O)_{0.71}(OH)_{0.71}$ |
| MOF-808PDS$_{1.7}$ | $Zr_6O_4(OH)_4(BTC)_2(HCOO)_{1.58}(PDS)_{1.70}(H_2O)_{2.72}(OH)_{2.72}$ | sorption branch, followed by intersection of the sorption branch at ca. 33% RH (FIG. 1C). This behavior is distinct from a typical sorption/desorption hysteresis and indicates that the structure of MOF-808 is altered during the first water sorption/desorption cycle, as evidenced by poor cyclic performance of MOF-808 for water sorption. The maximum water uptake of MOF-808 in the second cycle decreased to ca. 45% of the capacity of the first cycle, then underwent continued loss over the ensuing cycles, with only ca. 36% of its first cycle capacity remaining in the fifth cycle (FIG. 1D). Prior to sorption tests, the sorbents were degassed at room temperature for 6 hrs and at 150° C. for 12 hrs. For cyclic water vapor sorption measurements, the sorbents were regenerated under vacuum at 25° C. for 3 hrs.

As-synthesized MOF-808 showed a powder X-ray diffraction (PXRD) pattern in agreement with the simulated one (FIG. 1E), and Ar sorption capacity at 87 K—comparable to that reported in the literature (data not shown). The PXRD patterns of MOF-808 after water sorption tests, however, indicated partial amorphization of MOF-808, as evidenced by the significantly weakened and broadened peaks (FIG. 1E). The Brunauer-Emmett-Teller (BET) surface area and pore volume of MOF-808 were considerably lower after water sorption/desorption cycling, from 1774 $m^2$ $g^{-1}$ and 0.84 $cm^3$ $g^{-1}$ to 100 $m^2$ $g^{-1}$ and 0.06 $cm^3$ $g^{-1}$ (data not shown). The amorphization and reduced porosity could be attributed to capillary-force-driven pore collapsing during desorption (J. E. Mondloch et al., 2014).

To simultaneously improve both hydrophilicity and cyclic stability of MOF-808, post-synthetic modification (PSM) was explored using organic di-sulfonic acids. In this regard, 1,5-naphthalenedisulfonic acid (NDS), consisting of nonpolar naphthalene group and polar sulfonic acid groups, was used as a substituting ligand. Notably, the sulfonic acid group has been known to enhance hydrophilicity of porous materials (N. Ko, et al, 2015). Without being bound by theory, it was hypothesized that a possible outcome of PSM could be that, among the two sulfonic acid groups of NDS, one can serve for coordination bonding with Zr clusters and the other can remain as a free sulfonate group (FIG. 1B, right) to enhance water sorption and/or interact with other sulfonic acid groups through hydrogen bonding to create stabilizing linkages.

The successful incorporation of NDS ligands with the concurrent loss of formate ligands was confirmed by the proton nuclear magnetic resonance ($^1$H NMR) spectra of dissolved samples (data not shown). Based on the $^1$H NMR peak integration, and assuming that the BTC linker content of MOF-808 remains unaltered (i.e., BTC does not undergo ligand exchange during the PSM), the modified MOF-808 formula was determined to be $Zr_6(\mu_3-O)_4(\mu_3-OH)_4(BTC)_2$ $(NDS)_x(HCOO)_y(OH)_{6-x-y}(H_2O)_{6-x-y}$. FT-IR spectra also indicated the presence of S═O and S—O species (data not shown). These samples were denoted as MOF-808NDS$_x$ with the numerical subscript "x" representing the number of NDS molecules per unit formula, with their complete formula given in Table 1. The PXRD patterns of MOF-808NDS samples did not exhibit discernable differences from that of MOF-808 (FIG. 1E), confirming the preserved crystallinity after the PSM. The MOF-808NDS samples showed ca. 25% reduced porosity in comparison to the unmodified MOF-808, as determined by Ar sorption isotherms at 87 K (FIG. 3).

Despite the reduced pore volume of MOF-808NDS with respect to MOF-808, the maximum water uptake capacities of 29.5-32.8 mmol $g^{-1}$ were comparable to that of MOF-808 (30.6 mmol $g^{-1}$) (FIG. 1C). Whereas the major sorption step of 35-40% RH for MOF-808 is outside the 5-30% RH window desirable for AWH and AHT applications, MOF-808NDS exhibited a stepped isotherm at below 25% RH, revealing the improved hydrophilicity of MOF-808 after PSM (FIG. 1C). Unlike the irreversible isotherm trace of MOF-808, the desorption of MOF-808NDS is reversible, exhibiting a small hysteresis (FIG. 1C). The enhanced hydrophilicity was corroborated using IR spectra (data not shown).

In comparison to MOF-808, MOF-808NDS exhibited significantly enhanced water vapor sorption/desorption cyclic performance. The capacity decline of MOF-808NDS between the first and second cycles was much less severe than MOF-808, with MOF-808NDS$_{1.8}$ retaining ca. 89% of its maximum capacity of the first cycle in the second cycle (FIG. 1D and FIG. 4). The continued capacity loss after the second cycle appeared to be curbed in MOF-808NDS, especially with greater NDS loadings, establishing enhanced recyclability (FIG. 1D). MOF-808NDS retained well-defined PXRD patterns (FIG. 1C) and showed improved retention of porosity compared to MOF-808 (compare FIG. 5 to FIG. 6A-6D) after the cyclic water vapor sorption tests at 25° C., supporting the enhanced water stability.

To further understand how different structure components of NDS help to simultaneously enhance hydrophilicity and stability of MOF-808, the PSM of MOF-808 using p-toluenesulfonic acid (PTS) and 1-naphthoic acid (NTA) was also performed. Compared to NDS, PTS and NTA have similarly bulky aromatic groups but progressively fewer sulfonic acid groups. Like MOF-808NDS, MOF-808PTS and MOF-808NTA showed enhanced stability in cyclic water sorption tests. The number of sulfonic acid groups in the molecules, however, significantly affected water sorption capacity and hydrophilicity of modified MOF-808. The slope of the isotherm curve of MOF-808NTA$_{3.7}$ was more gradual than that of MOF-808 (data not shown), possibly revealing that MOF-808NTA$_{3.7}$ is more hydrophobic than MOF-808, and indirectly demonstrating that sulfonate groups are important to enhance hydrophilicity of MOFs. On the other hand, MOF-808NTA$_{3.7}$ showed enhanced water stability compared to MOF-808, indicating that a hydrophobic naphthalene group contributes to enhance the stability of MOF-808 under water vapor. The PSM with PTS possessing a hydrophilic monosulfonic acid group and a hydrophobic toluene group led to an increase in the both hydrophilicity and water stability of MOF-808. Nevertheless, the extent of the improvements by PTS was not as significant as with an NDS. Despite the comparable pore volumes, the water uptake of MOF-808PTS$_{1.2}$ was much lower than that of MOF-808NDS, likely due to the lack of free sulfonate groups in MOF-808PTS$_{1.2}$.

Next, the rigid and bulky core of NDS was replaced with a flexible and linear di-acid, 1,3-propanedisulfonic acid (PDS). Uptake capacities of samples with different functional groups and loadings, normalized by pore volume (determined by Ar adsorption) are presented in FIG. 7. MOF-808PDS$_{1.7}$ showed the highest water uptake capacity (i.e., 33.8 mmol $g^{-1}$ in the first cycle) (see also FIG. 8A). Despite an 18% capacity loss in the second cycle, the water vapor sorption/desorption performance of MOF-808PDS$_{1.7}$ was stabilized, retaining the uptake capacity for three additional cycles (FIG. 8A). The preserved sharp PXRD pattern after five cycles of water vapor sorption/desorption further supports the stability of MOF-808PDS$_{1.7}$ (data not shown). Unlike MOF-808NDS$_{1.8}$, which exhibited three-step water vapor sorption isotherms, MOF-808PDS$_{1.7}$ exhibited two-step water vapor sorption isotherms (FIG. 8B). MOF- 808PDS$_{1.7}$ showed a more pronounced and steeper main step than MOF-808NDS$_{1.8}$, resulting in greater working capacity at 17-24% RH (i.e., 14.5 mmol g$^{-1}$ for MOF-808PDS$_{1.7}$ vs. 10.5 mmol g$^{-1}$ for MOF-808NDS$_{1.8}$) (FIG. 8B).

The stability of MOF-808NDS$_{1.8}$ and MOF-808PDS$_{1.7}$ in the presence of water vapor was examined by conducting sorption/desorption measurements at continuously increasing temperatures up to 60° C. (data not shown). Negligible changes in water vapor uptakes at 25° C. were observed, indicating that stable performance of MOF-808NDS$_{1.8}$ and MOF-808PDS$_{1.7}$ can be maintained up to 60° C. In addition, there were no significant changes between the first and the second cycles of water vapor isotherms for MOF-808NDS$_{1.8}$ until 60° C., further supporting the good hydrothermal stability of MOF-808NDS$_{1.8}$ up to this temperature (data not shown).

The isosteric heats of sorption of MOF-808NDS$_{1.8}$ and MOF-808PDS$_{1.7}$ were estimated by the water vapor isotherms at 25° C., 40° C., and 50° C. using the Clausius-Clapeyron equation (data not shown). The heats of sorption of MOF-808NDS$_{1.8}$ and MOF-808PDS$_{1.7}$ in the 5-20 mmol g$^{-1}$ range were ca. 46-49 kJ mol$^{-1}$ and ca. 45-47 kJ mol$^{-1}$, respectively, which are greater than the latent heat of vaporization for water (40.7 kJ mol$^{-1}$) (M. F. de Lange, et al., 2015) and comparable with or lower than the average isosteric heats of sorption of 60 kJ mol$^{-1}$, 53 kJ mol$^{-1}$, and 50 kJ mol$^{-1}$ reported for MOF-801, MOF-303, and MOF-333, respectively (N. Hanikel, et al., 2021; H, Furukawa, et al., 2014).

The potential practical significance of the water uptake capacities of MOF-808, MOF-808NDS$_{1.8}$, and MOF-808PDS$_{1.7}$ were evaluated by comparing with literature values of benchmark materials (data not shown). Among the 57 data points, the water uptake capacities at 25° C. of MOF-808, MOF-808NDS$_{1.8}$, and MOF-808PDS$_{1.7}$ were ranked 28$^{th}$, 29$^{th}$, and 20$^{th}$, respectively, at 90% RH (FIG. 9A). On the other hand, at the low RH of 30%, while MOF-808 showed one of the lowest water uptakes (i.e., ranked 38$^{th}$ of 57), the water uptake of fresh MOF-808PDS$_{1.7}$ and MOF-808NDS$_{1.8}$ were the second and fourth highest (FIG. 9B). Considering the vapor pressure range relevant for applications such as AWH and AHT, the enhancement of water sorption at below 30% RH is practically more significant compared to modifications just improving maximum capacities. PSM enables MOF-808, which is an undesirable material for water vapor sorption, to be one of the high-performance water vapor sorbent materials.

Previously reported high performance materials (MOF-801, MOF-841, MOF-303, and MOF-333) were selected for comparison with MOF-808NDS$_{1.8}$ and MOF-808PDS$_{1.7}$. The isotherms were taken after stabilization (e.g., 5$^{th}$ cycle isotherms at 25° C.). The maximum water vapor uptake capacities of the listed MOFs are comparably high (>23 mmol g$^{-1}$), except MOF-801, whereas MOF-801 exhibited the increase in sorption at the lowest RH (FIG. 9C). The major sorption step decreased in the following order: MOF-841>MOF-333~MOF-808PDS$_{1.7}$>MOF-808NDS$_{1.8}$>MOF-303>MOF-801 (FIG. 9C). As temperature increased to 45° C., there were only slight changes in isotherms (data not shown).

CONCLUSION

A post-synthetic modification (PSM) strategy improving hydrophilicity and water stability of metal-organic framework-808 (MOF-808) simultaneously while maintaining high maximum water vapor uptake capacity (i.e., working capacity) was demonstrated using 1,5-naphthalenedisulfonic acid (NDS) and 1,3-propanedisulfonic acid (PDS). Despite the ca. 30% reduced pore volume of modified MOF-808 (MOF-808NDS and MOF-808PDS), the enhanced hydrophilicity allowed achievement of an uptake capacity comparable to that of the unmodified one with significantly shifted step in sorption from 35-40% relative humidity (RH) to below 25% RH. At the same time, the poor cyclic water sorption performance of MOF-808, showing only ca. 36% capacity retention at the fifth cycle (compared to that of the first cycle), was considerably improved up to ca. 80% and ca. 87% capacity retention at the fifth cycle (compared to the first) for MOF-808PDS and MOF-808NDS, respectively (FIG. 1D). Furthermore, the modified MOF-808 exhibited hydrothermal stability up to 60° C. without losing its uptake capacities. MOF-808NDS and MOF-808PDS exhibited high uptake capacities, comparable with other benchmark MOF sorbents at 30% RH.

It is understood that the foregoing detailed description and accompanying examples are merely illustrative and are not to be taken as limitations upon the scope of the disclosure, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the disclosure, may be made without departing from the spirit and scope thereof.

REFERENCES

N. C. Burtch, et al., *Chem. Rev.*, 114 (2014) 10575-10612.
A. Cadiau, et al. *Advanced Materials*, 27 (2015) 4775-4780.
M. F. de Lange, et al., *Chemical Reviews*, 115 (2015) 12205-12250.
P. Deria, et al., *Chemical Science*, 6 (2015) 5172-5176.
F. Fathieh, et al., *Science Advances*, 4 (2018) 3198-3206.
H. Furukawa et al., *J. Am. Chem. Soc.*, 136, 11 (2014) 4369-4381.
N. Hanikel, et al., *Nature Nanotechnology*, 15 (2020) 348-355.
N. Hanikel, et al., *Science*, 374 (2021) 454-459.
J. Jiang et al., *J. Am. Chem. Soc.*, 136, 37 (2014) 12844-12847.
N. Ko, et al., *Journal of Materials Chemistry A*, 3 (2015) 2057-2064.
X. Liu, et al., *Chemistry of Materials*, 33 (2021) 1444-1454.
J. E. Mondloch, et al., *Chem. Commun.*, 50 (2014) 8944-8946.

What is claimed is:

1. A modified metal-organic framework material, comprising a zirconium-based metal-organic framework compound having the formula Zr$_6$($\mu_3$-O)$_4$($\mu_3$-OH)$_4$(benzene-1,3,5-tricarboxylic acid)$_2$(L)$_x$(HCOO)$_y$(OH)$_{6-x-y}$(H$_2$O)$_{6-x-y}$, wherein L is a ligand selected from the group consisting of at least one of a sulfonic acid group, a sulfonate group, and combinations thereof, 0<x≤6 and y=6−x, wherein the at least one sulfonic acid group, at least one sulfonate-containing group, or combinations thereof, are selected from:

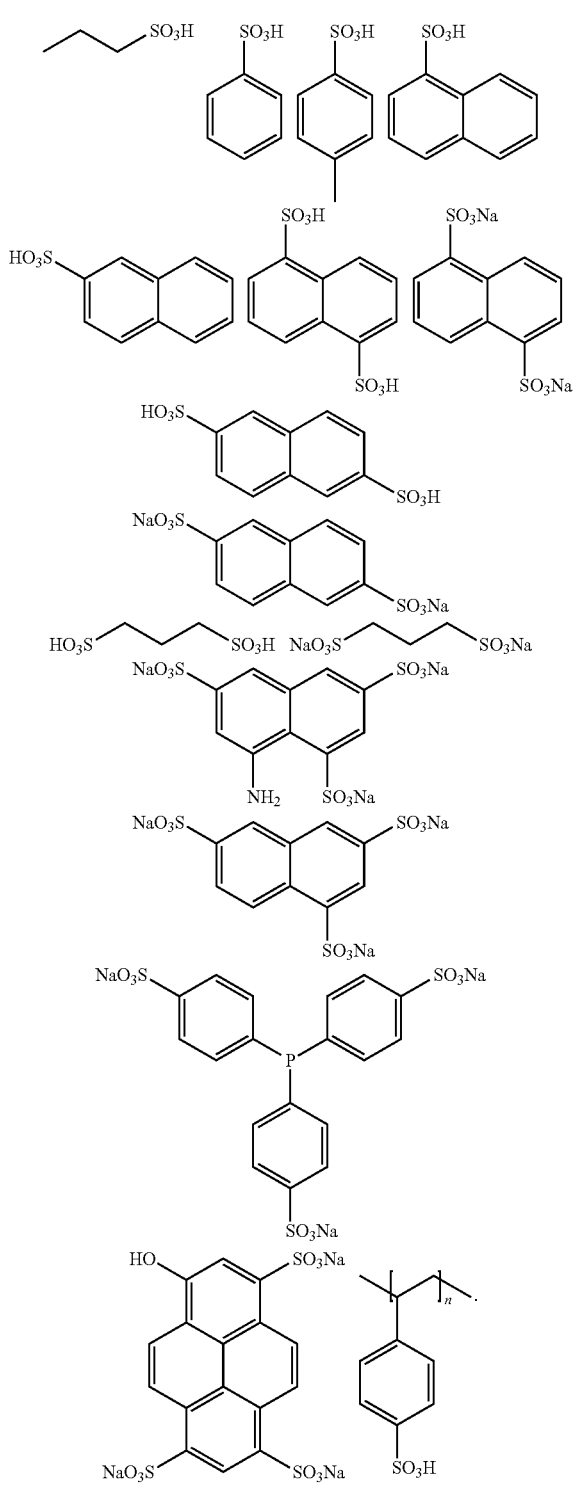

2. The modified metal-organic framework material of claim 1, wherein x is a value between about 0.5 and 4.

3. The modified metal-organic framework material of claim 1, wherein x is a value between about 0.8 and 3.5.

4. The modified metal-organic framework material of claim 1, wherein x is a value between about 0.8 and 2.5.

5. The modified metal-organic framework material of claim 1, wherein the at least one sulfonate-containing group comprises 1,5-naphthalenedisulfonic acid, 1,3-propanedisulfonic acid, or 1,5-naphthalenedisulfonic acid disodium salt.

6. The modified metal-organic framework material of claim 1, wherein the at least one sulfonate-containing group comprises 1,5-naphthalenedisulfonic acid.

7. The modified metal-organic framework material of claim 1, wherein the at least one sulfonate-containing group comprises 1,3-propanedisulfonic acid.

8. A method for post-synthetic functionalization of metal-organic framework compounds comprising contacting a parent metal-organic framework compound with a solution comprising an organic molecule comprising at least one ligand L to form the modified metal-organic framework material of claim 1.

9. The method of claim 8, wherein the modified metal-organic framework material is formed in a single step.

10. The method of claim 8, wherein the method does not include a step of reacting the parent metal-organic framework compound with hydrochloric acid before reacting with the organic molecule.

11. The method of claim 8, further comprising separating the modified metal-organic framework material from the solution through centrifugation or filtration and washing the modified metal-organic framework material with one or more solvents.

12. The method of claim 8, wherein the parent metal-organic framework compound is MOF-808.

13. A method for simultaneously enhancing water stability and hydrophilicity of metal-organic framework compounds for water sorption-based applications, said method comprising contacting a parent metal-organic framework compound with a solution comprising an organic molecule comprising at least one ligand L to form the modified metal-organic framework material of claim 1, wherein the modified metal-organic framework material has enhanced water stability and hydrophilicity relative to the parent metal-organic framework compound.

14. The method of claim 13, wherein the modified metal-organic framework material is formed in a single step.

15. The method of claim 13, wherein the method does not include a step of reacting the parent metal-organic framework compound with hydrochloric acid before reacting with the organic molecule.

16. The method of claim 13, further comprising separating the modified metal-organic framework material from the solution through centrifugation or filtration and washing the modified metal-organic framework material with one or more solvents.

* * * * *

UNITED STATES PATENT AND TRADEMARK OFFICE
CERTIFICATE OF CORRECTION

PATENT NO. : 12,415,820 B2
APPLICATION NO. : 18/054956
DATED : September 16, 2025
INVENTOR(S) : Tianyi Luo et al.

Page 1 of 1

It is certified that error appears in the above-identified patent and that said Letters Patent is hereby corrected as shown below:

In the Claims

Column 19, Claim 1, Line 26-31 should read:

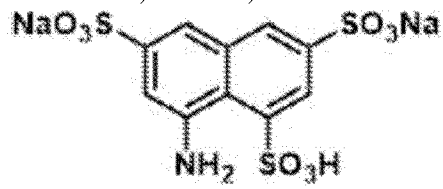

Signed and Sealed this
Twenty-eighth Day of October, 2025

John A. Squires
*Director of the United States Patent and Trademark Office*